United States Patent
Yasuda et al.

(10) Patent No.: US 12,545,761 B2
(45) Date of Patent: Feb. 10, 2026

(54) PHOTOCURABLE FLUOROPOLYETHER-BASED ELASTOMER COMPOSITION AND BONDING METHOD THEREOF

(71) Applicant: SHIN-ETSU CHEMICAL CO., LTD., Tokyo (JP)

(72) Inventors: Hiroyuki Yasuda, Annaka (JP); Mitsuo Muto, Annaka (JP); Kenichi Fukuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 845 days.

(21) Appl. No.: 17/770,756

(22) PCT Filed: Nov. 5, 2020

(86) PCT No.: PCT/JP2020/041296
§ 371 (c)(1),
(2) Date: Apr. 21, 2022

(87) PCT Pub. No.: WO2021/095621
PCT Pub. Date: May 20, 2021

(65) Prior Publication Data
US 2022/0396662 A1    Dec. 15, 2022

(30) Foreign Application Priority Data
Nov. 11, 2019  (JP) ................... 2019-203876

(51) Int. Cl.
| | | |
|---|---|---|
| C08G 65/22 | (2006.01) | |
| C08G 65/00 | (2006.01) | |
| C08G 65/336 | (2006.01) | |
| C08G 77/08 | (2006.01) | |
| C08G 77/12 | (2006.01) | |
| C08G 77/14 | (2006.01) | |
| C08G 77/24 | (2006.01) | |
| C08G 77/46 | (2006.01) | |
| C08J 7/04 | (2020.01) | |
| C08J 7/043 | (2020.01) | |
| C08J 7/12 | (2006.01) | |
| C08K 3/34 | (2006.01) | |
| C08K 3/36 | (2006.01) | |
| C08L 71/00 | (2006.01) | |
| C08L 83/04 | (2006.01) | |
| C08L 83/12 | (2006.01) | |
| C09J 183/12 | (2006.01) | |

(52) U.S. Cl.
CPC ......... *C08G 65/226* (2013.01); *C08G 65/336* (2013.01); *C08G 77/08* (2013.01); *C08G 77/12* (2013.01); *C08G 77/14* (2013.01); *C08G 77/24* (2013.01); *C08J 7/0427* (2020.01); *C08K 3/36* (2013.01); *C08G 2170/00* (2013.01); *C08G 2650/04* (2013.01); *C08G 2650/16* (2013.01); *C08G 2650/48* (2013.01); *C08G 2650/58* (2013.01); *C08K 2201/005* (2013.01)

(58) Field of Classification Search
None
See application file for complete search history.

(56) References Cited

U.S. PATENT DOCUMENTS

| | | |
|---|---|---|
| 5,656,711 A | 8/1997 | Fukuda et al. |
| 6,417,311 B1 | 7/2002 | Fukuda et al. |
| 2016/0222170 A1 | 8/2016 | Muto et al. |

FOREIGN PATENT DOCUMENTS

| | | | |
|---|---|---|---|
| CN | 107474514 A | 12/2017 | |
| EP | 3 053 945 A1 | 8/2016 | |
| JP | 3239717 B2 | 12/2001 | |
| JP | 3567973 B2 | 9/2004 | |
| JP | 2007-106785 A | 4/2007 | |
| JP | 2013001798 A * | 1/2013 | .......... C08G 65/323 |
| JP | 2013-60493 A | 4/2013 | |
| JP | 2013060493 A * | 4/2013 | |
| JP | 2016-145354 A | 8/2016 | |
| JP | 2017132853 A * | 8/2017 | |

OTHER PUBLICATIONS

Chinese Office Action and Search Report for corresponding Chinese Application No. 202080078151.2, dated Jan. 24, 2024, with English translation.
International Search Report, issued in PCT/JP2020/041296, PCT/ISA/210, dated Jan. 26, 2021.
Written Opinion of the International Searching Authority, issued in PCT/JP2020/041296, PCT/ISA/237, dated Jan. 26, 2021.
Japanese Office Action for Japanese Application No. 2021-556049, dated Jan. 17, 2023, with an English translation.
Extended European Search Report for European Application No. 20888342.1, dated Nov. 8, 2023.

* cited by examiner

*Primary Examiner* — Ha S Nguyen
(74) *Attorney, Agent, or Firm* — Birch, Stewart, Kolasch & Birch, LLP

(57) ABSTRACT

Provided are a photocurable fluoropolyether-based elastomer composition having both a favorable preservation stability and fast curability, being bondable at a low temperature in a short period of time, and generating no air bubbles in the resin at the time of curing; and a bonding method thereof. The photocurable fluoropolyether-based elastomer composition contains:
(A) a linear polyfluoro compound;
(B) a fluorine-containing organohydrogenpolysiloxane;
(C) a photoactive hydrosilylation reaction catalyst; and
(D) a zeolite having an average primary particle size of not larger than 30 μm.

10 Claims, No Drawings

PHOTOCURABLE FLUOROPOLYETHER-BASED ELASTOMER COMPOSITION AND BONDING METHOD THEREOF

TECHNICAL FIELD

The present invention relates to a photocurable fluoropolyether-based elastomer composition; and a bonding method thereof.

BACKGROUND ART

Conventionally, there is known a curable fluorine-containing elastomer composition utilizing an addition reaction between alkenyl groups and hydrosilyl groups that takes place when heated; further, as a third component, there has been proposed a composition(s) endowed with a self-adhesiveness as a result of adding an organopolysiloxane having hydrosilyl groups (SiH groups) and epoxy and/or trialkoxysilyl groups (Patent documents 1 and 2). Since these compositions can be cured by heating, and the cured products obtained (fluorine-containing elastomers) are superior in solvent resistance, chemical resistance, heat resistance, low-temperature property, low-moisture permeability and electric property, they are used for adhesion purposes in various industrial fields requiring the abovementioned properties. Particularly, they are heavily used as adhesion sealing agents for electric parts in the automobile industry.

In recent years, from the perspectives of energy saving and productivity improvement, there has been demanded the development of an elastomer material that is curable and bondable at a lower temperature and in a shorter period of time. However, there is a dilemma where a preservation stability and a usable life will be sacrificed if seeking a fast curability in the above adhesive composition of the heat-curable type, whereas the fast curability will be sacrificed if ensuring a favorable preservation stability and usable life. Further, since both a curing step and a bonding step are encompassed in one heating treatment, the curing step will be time-consuming if seeking an adhesiveness between the cured product and a base material at a lower temperature, thus making it difficult to realize curing and achieve adhesiveness in a short period of time.

In the meantime, as an elastomer composition superior in, for example, water and oil repellency and chemical resistance, there has been developed a photocurable fluoropolyether-based rubber composition containing: (A) a linear fluoropolyether compound having at least two alkenyl groups and a perfluoropolyether structure; (B) an organopolysiloxane having at least two mercapto groups, and having a monovalent fluoroalkyl or fluoropolyether group(s); and (C) a photoinitiator. This composition is expected to be utilized as a coating material and potting material for use in various electric and electronic parts such as those employed in automobiles, chemical plants, ink-jet printers, and production lines of semiconductors (Patent document 3).

However, in the case of the above photocurable fluoropolyether-based rubber composition, the cured product thereof is extremely soft being in the form of a gel or rubber, and has no adhesiveness to various kinds of base materials. Thus, while the composition is a preferable material for coating and potting purposes with regard to various kinds of base materials, it is a material that is difficult to be utilized for purposes requiring an adhesiveness to a base material, such as a sealing material and an adhesion sealing material; and purposes requiring a strength as an elastomer material.

In view of these problems, there has been proposed a photocurable fluoroelastomer material having both a favorable preservability and a favorable fast curability under room temperature, and expressing an adhesiveness at a low temperature in a short period of time (Patent document 4).

PRIOR ART DOCUMENTS

Patent Documents

Patent document 1: Japanese Patent No. 3239717
Patent document 2: Japanese Patent No. 3567973
Patent document 3: JP-A-2007-106785
Patent document 4: JP-A-2016-145354

SUMMARY OF THE INVENTION

Problems to be Solved by the Invention

However, in the case of a photocurable fluoropolyether-based rubber composition, if prioritizing fast curability and an adhesiveness expressed in a short period of time thereby, hydrogens that have been generated by a dehydrogenation reaction of the Si—H groups contained in a cross-linking agent at the time of curing after UV irradiation will remain in the resin material as air bubbles such that the resin strength will then deteriorate.

Thus, it is an object of the present invention to provide a photocurable fluoropolyether-based elastomer composition endowed with features of having both a favorable preservation stability and fast curability, being bondable at a low temperature in a short period of time, and generating no air bubbles in the resin at the time of curing; and a bonding method thereof.

Means to Solve the Problems

In order to achieve the above objective, the inventors of the present invention diligently conducted a series of studies and, as a result, completed the invention as follows. Specifically, the inventors of the present invention found that by applying a foaming inhibitor-containing photocurable fluoropolyether-based elastomer composition to the surface of a base material, and then photocuring the same, the base material and a fluorine elastomer could be bonded together at a low temperature in a short period of time without generating air bubbles in the resin.

That is, the present invention is to provide the following foaming inhibitor-containing photocurable fluoropolyether-based elastomer composition and a bonding method thereof.

[1]
A photocurable fluoropolyether-based elastomer composition comprising:
- (A) 100 parts by mass of a linear polyfluoro compound having at least two alkenyl groups per each molecule and a perfluoropolyether structure in a main chain;
- (B) a fluorine-containing organohydrogenpolysiloxane having at least two silicon atom-bonded hydrogen atoms per each molecule, the component (B) being in an amount at which the silicon atom-bonded hydrogen atoms in the component (B) are in an amount of 0.5 to 3.0 mol per 1 mol of the alkenyl groups in the component (A);
- (C) a photoactive hydrosilylation reaction catalyst in an amount of 0.1 to 500 ppm with respect to a mass of the component (A); and (D) 0.1 to 20 parts by mass of a zeolite having an average primary particle size of not larger than 30 μm.

[2]

The photocurable fluoropolyether-based elastomer composition according to [1], wherein the component (A) is a linear fluoropolyether compound represented by the following formula (1):

$$CH_2=CH-(X)_g-Rf'-(X')_g-CH=CH_2 \quad (1)$$

wherein X represents $-CH_2-$, $-CH_2O-$, $-CH_2OCH_2-$ or $-Y-NR^1-CO-$; X' represents $-CH_2-$, $-OCH_2-$, $-CH_2OCH_2-$ or $-CO-NR^2-Y'-$; g independently represents 0 or 1; Rf' represents a divalent perfluoropolyether group expressed by a formula (i) or (ii), wherein Y represents $-CH_2-$, $-Si(CH_3)_2CH_2CH_2CH_2-$, $-Si(CH_3)(CH=CH_2)CH_2CH_2CH_2-$, $-Si(CH=CH_2)_2CH_2CH_2CH_2-$, or a o-, m- or p-silylphenylene group represented by a structural formula (Z); $R^1$ represents a hydrogen atom or a substituted or unsubstituted monovalent hydrocarbon group; Y' represents $-CH_2-$, $-CH_2CH_2CH_2Si(CH_3)_2-$, $-CH_2CH_2CH_2Si(CH_3)(CH=CH_2)-$, $-CH_2CH_2CH_2Si(CH=CH_2)_2-$, or a o-, m- or p-silylphenylene group represented by a structural formula (Z'); $R^2$ represents a hydrogen atom or a substituted or unsubstituted monovalent hydrocarbon group, wherein the structural formulae (Z) and (Z') are:

[Chemical formula 1]

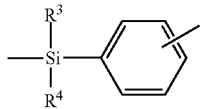
(Z)

wherein each of $R^3$ and $R^4$ independently represents $-CH_3$ or $-CH=CH_2$; and

[Chemical formula 2]

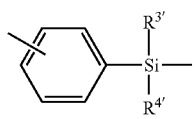
(Z')

wherein each of $R^{3'}$ and $R^{4'}$ independently represents $-CH_3$ or $-CH=CH_2$, and the formulae (i) and (ii) are:

[Chemical formula 3]

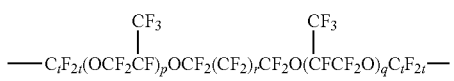
(i)

wherein each of p and q is 0 or an integer of 1 to 150, an average of a sum of p and q is 2 to 200, r is an integer of 0 to 6, t is 2 or 3; and

[Chemical formula 4]

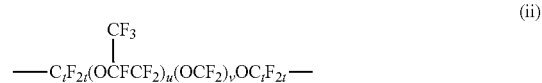
(ii)

wherein u is an integer of 1 to 200, v is an integer of 1 to 50, t is 2 or 3.

[3]

The photocurable fluoropolyether-based elastomer composition according to [1] or [2], further comprising:
(E) a hydrophobic silica powder in an amount of 0.5 to 30 parts by mass per 100 parts by mass of the component (A).

[4]

The photocurable fluoropolyether-based elastomer composition according to any one of [1] to [3], further comprising:
(F) an organohydrogen siloxane compound having, per each molecule, at least one silicon atom-bonded hydrogen atom and at least one epoxy and/or trialkoxysilyl group bonded to the silicon atom via a carbon atom or carbon and oxygen atoms, the component (F) differing from the component (B) and being in an amount of 0.05 to 5.0 parts by mass per 100 parts by mass of the component (A).

[5]

The photocurable fluoropolyether-based elastomer composition according to any one of [1] to [4], further comprising:
(G) a reaction control agent for hydrosilylation reaction.

[6]

A bonding method for bonding a cured product of an elastomer composition to a base material, comprising:
  a step of modifying a surface of a base material by plasma irradiation in advance;
  a step of applying the photocurable fluoropolyether-based elastomer composition according to any one of [1] to [5] to an outer surface of the base material, and then curing the elastomer composition by performing light irradiation on a surface of the elastomer composition; and
  a step of leaving the cured composition at rest at 10 to 120° C.

[7]

The bonding method according to [6], wherein the base material is made of a metal, glass, ceramics or a synthetic resin.

Effects of the Invention

According to the bonding method of the present invention, by applying the foaming inhibitor-containing photocurable fluoropolyether-based elastomer composition, and then photocuring the same, the base material and the fluorine-containing elastomer can be bonded together at a low temperature in a short period of time without generating air bubbles in the resin.

MODE FOR CARRYING OUT THE INVENTION

The present invention is described in detail hereunder; the present invention shall not be limited to the following embodiments

[Component (A)]

It is preferred that a linear polyfluoro compound as a component (A) in the photocurable fluoropolyether-based elastomer composition of the present invention be the linear fluoropolyether compound represented by the above formula (1). Here, in the present invention, "linear" refers to a state where fluorooxyalkylene groups as repeating units composing the main chain (fluoropolyether structure) of a polyfluoro compound are linearly bonded to one another; each repeating unit (fluorooxyalkylene group) itself composing the fluoropolyether structure may be either linear or branched (e.g. perfluorooxy(methyl)methylene group, perfluorooxy(methyl)ethylene group and perfluorooxy(methyl)propylene group).

Here, as $R^1$ and $R^2$, preferred are a hydrogen atom and a hydrocarbon group having 1 to 12, particularly 1 to 10 carbon atoms. Specific examples of such hydrocarbon group include an alkyl group such as a methyl group, an ethyl group, a propyl group, a butyl group, a hexyl group, a cyclohexyl group and an octyl group; an aryl group such as a phenyl group and a tolyl group; an aralkyl group such as a benzyl group and a phenylethyl group; and a substituted monovalent hydrocarbon group obtained by substituting part of or all the hydrogen atoms in any of these groups with halogen atoms such as fluorine atoms.

Here, $Rf^f$ in the above formula (1) represents a divalent perfluoropolyether group, and is expressed by the following formula (i) or (ii).

[Chemical formula 5]

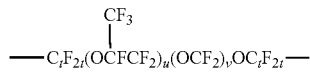

(i)

(In the formula (i), each of p and q is 0 or an integer of 1 to 150, preferably an integer of 10 to 150, and an average of a sum of p and q is 2 to 200, preferably 20 to 160. Further, r is an integer of 0 to 6, preferably an integer of 0 to 4; t is 2 or 3.)

[Chemical formula 6]

(ii)

—$C_tF_{2t}$(OCFCF$_2$)$_u$(OCF$_2$)$_v$OC$_t$F$_{2t}$—
    |
    CF$_3$ (In the formula (ii), u is an integer of 1 to 200, preferably an integer of 20 to 160; v is an integer of 1 to 50, preferably an integer of 5 to 40; t is 2 or 3.)

Preferable examples of $Rf^f$ include the following three ((i-1), (i-2) and (ii-1)).

Particularly, the divalent group having the structure of the first formula (i-1) is preferred.

[Chemical formula 7]

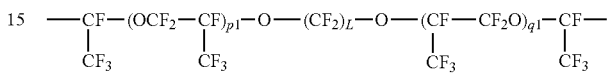

(i-1)

(In the formula (i-1), each of p1 and q1 is an integer of 1 to 150, provided that p1+q1 (average)=2 to 200. L is an integer of 2 to 6.)

[Chemical formula 8]

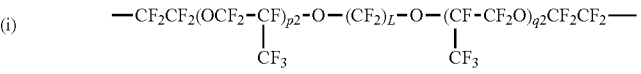

(i-2)

(In the formula (i-2), each of p2 and q2 is an integer of 1 to 150, provided that p2+q2 (average)=2 to 200. L is an integer of 2 to 6.)

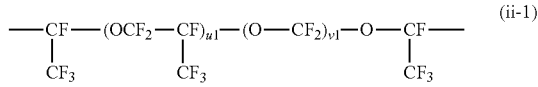

(ii-1)

(In the formula (ii-1), u1 is an integer of 1 to 200, v1 is an integer of 1 to 50.)

As a preferable example of the component (A), there may be listed a compound represented by the following formula (2).

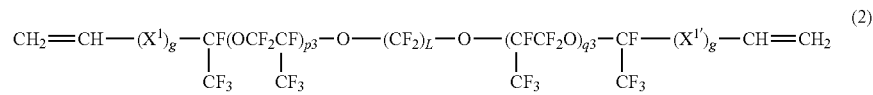

(2)

[In the formula (2), $X^1$ represents —$CH_2$—, —$CH_2O$—, —$CH_2OCH_2$— or —Y—$NR^{11}$—CO— (Y represents those mentioned above; $R^{11}$ represents a hydrogen atom, a methyl group, a phenyl group or an allyl group). $X^{1'}$ is a group represented by —$CH_2$—, —$OCH_2$—, —$CH_2OCH_2$— or —CO—$NR^{12}$—Y'— ($R^{12}$ represents those represented by $R^{11}$, Y' represents those mentioned above). g independently represents 0 or 1. L is an integer of 2 to 6. Each of p3 and q3 is an integer of 1 to 150, provided that p3+q3 (average)=2 to 200.]

Specific examples of the linear fluoropolyether compound represented by the formula (1) include those represented by the following formulae.

[Chemical formula 11]

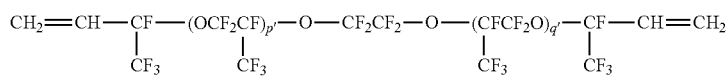

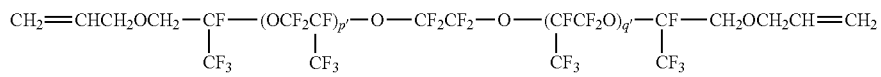

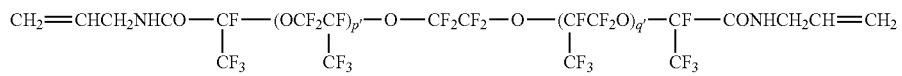

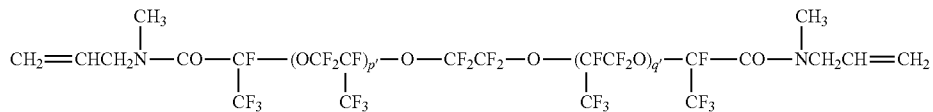

(In these formulae, each of p' and q' is an integer of 1 to 150, provided that p'+q' (average)=6 to 200.)

[Chemical formula 12]

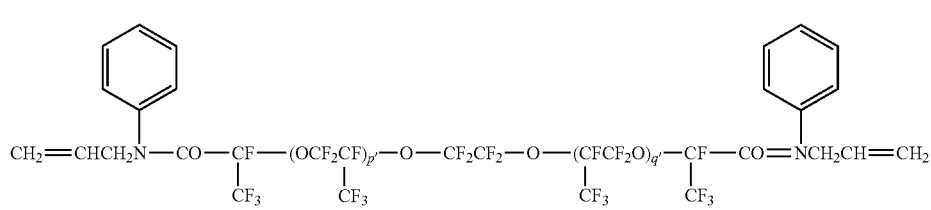

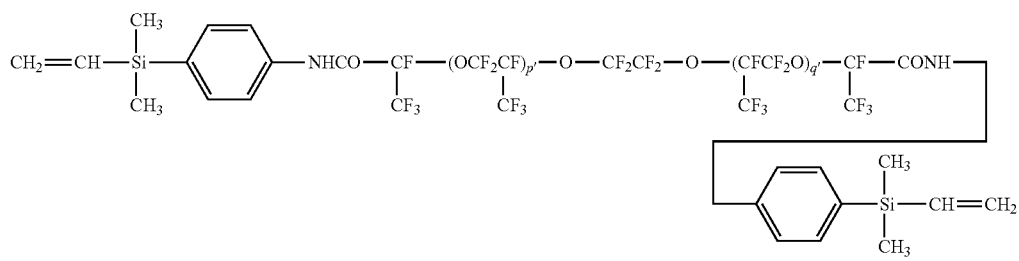

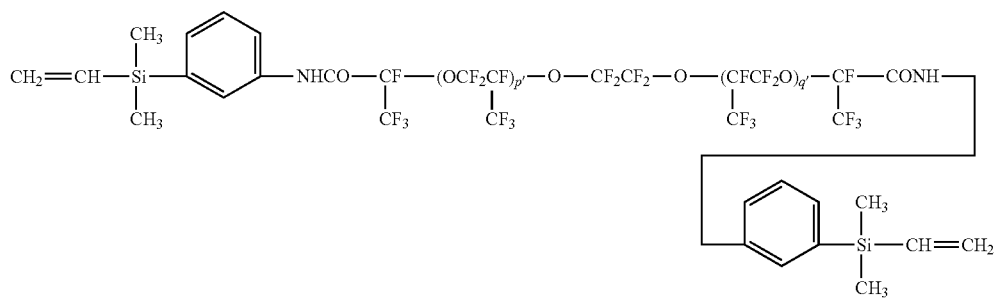

-continued
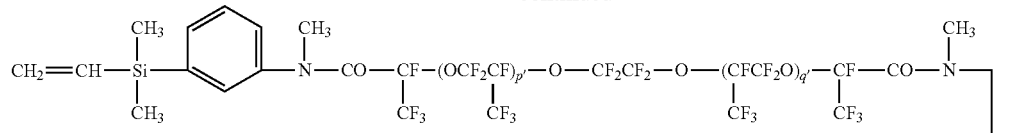
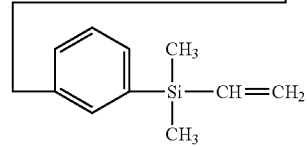
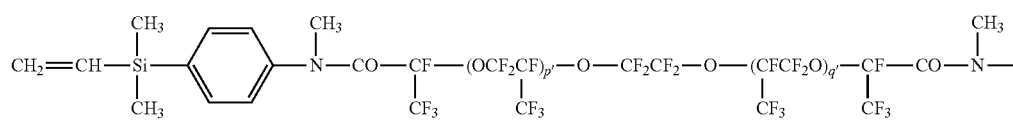
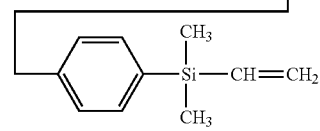
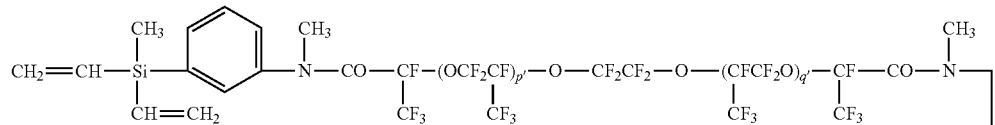
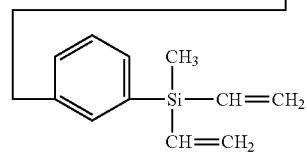
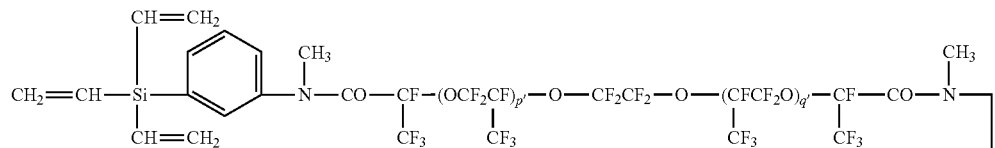
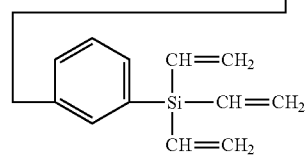
(In these formulae, each of p' and q' is an integer of 1 to 150, provided that p'+q' (average)=6 to 200.)
[Chemical formula 13]
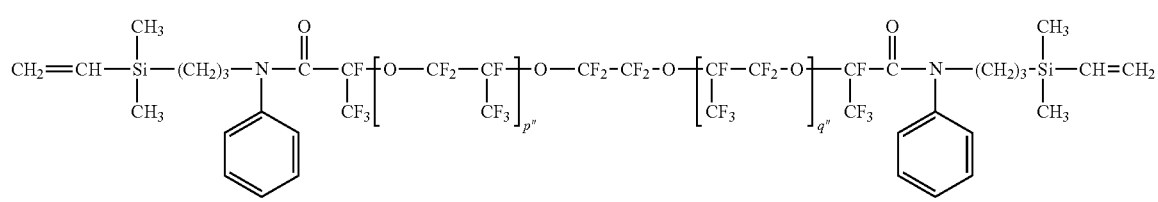

-continued

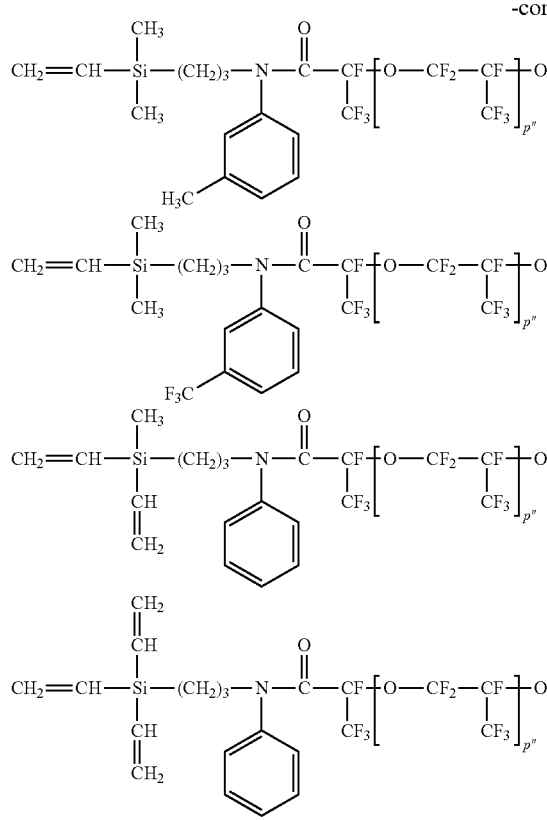
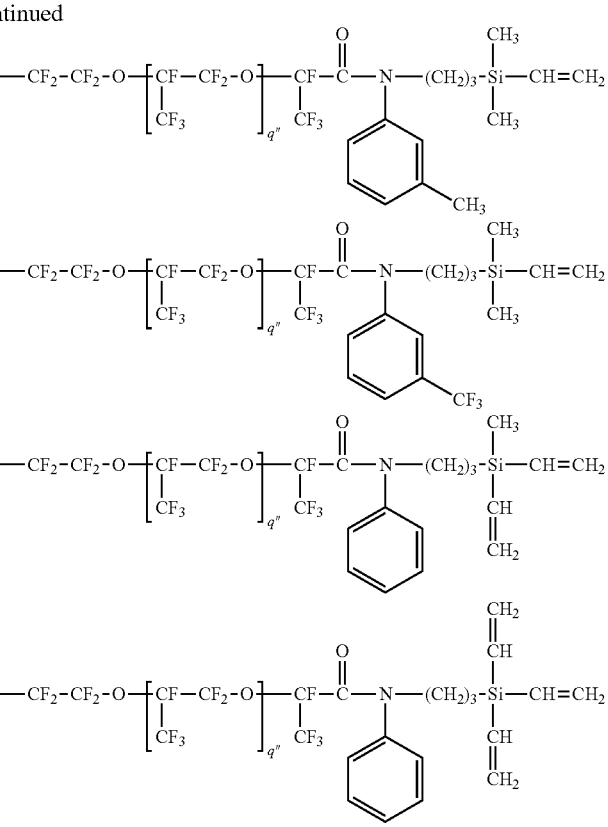

(In these formulae, each of p" and q" is an integer of 1 to 150, provided that p"+q" (average)=2 to 200.)

It is preferred that the amount of the alkenyl groups (especially, silicon atom-bonded alkenyl groups) contained in the linear fluoropolyether compound represented by the formula (1) be 0.005 to 0.050 mol/100 g, more preferably 0.007 to 0.040 mol/100 g. When the amount of the alkenyl groups contained in the linear fluoropolyether compound is too small, the physical strength of a cured product may be impaired, or the cured product may not be able to be obtained. When the amount of the alkenyl groups contained in the linear fluoropolyether compound is too large, the cured product obtained may be brittle and easily break.

Here, it is desired that the viscosity (23° C.) of the linear fluoropolyether compound represented by the formula (1) be in a range of 100 to 100,000 mPa s, more preferably 500 to 50,000 mPa·s, even more preferably 1,000 to 20,000 mPa s, since the cured product obtained will likewise possess proper physical properties if the photocurable fluoropolyether-based elastomer composition is used for, sealing, potting, coating, impregnation or the like. As the linear fluoropolyether compound represented by the formula (1), a compound having the most appropriate viscosity is selected depending on an intended purpose. Further, a polymer with a low viscosity and a polymer with a high viscosity may be mixed together so as to be adjusted to a desired viscosity before use.

Here, in the present invention, viscosity is measured by a rotary viscometer (e.g. BL type, BH type, BS type, cone-plate type and a rheometer); particularly the viscosity (23° C.) of the linear fluoropolyether compound represented by the formula (1) is measured in accordance with JIS K7117-1. Further, a polymerization degree (or molecular weight) of the linear fluoropolyether compound that is reflected by, for example, the number of the repeating perfluorooxyalkylene units composing the perfluoropolyether structure of the main chain, is obtained as, for example, a number average polymerization degree (or number average molecular weight) in terms of polystyrene in a gel permeation chromatography (GPC) analysis using a fluorine-based solvent as a developing solvent.

Further, since the number average molecular weight of the linear fluoropolyether compound represented by the formula (1) is to be adjusted to a desired value depending on an intended purpose before use, the aforementioned linear fluoropolyether compound may be previously subjected to a hydrosilylation reaction with an organic silicon compound containing two hydrosilyl groups (Si—H groups) per each molecule under a general method and condition, whereby a product with its chain length extended can then be used as the component (A).

One of these linear fluoropolyether compounds may be used alone, or two or more of them may be used in combination.

It is preferred that the component (A) which is the linear polyfluoro compound having at least two alkenyl groups per each molecule and the perfluoropolyether structure in the main chain be contained in the composition by an amount of 50 to 99% by mass, more preferably 70 to 95% by mass, even more preferably 80 to 95% by mass.

[Component (B)]

A component (B) is a fluorine-containing organohydrogenpolysiloxane (fluorine-containing organohydrogenpolysiloxane) having, per each molecule, at least 2, preferably 3 to 50 silicon atom-bonded hydrogen atoms (i.e. hydrosilyl groups represented by Si—H). The component (B) functions as a cross-linking agent and/or chain extender of the component (A). Further, in terms of, for example, compatibility with the component (A), dispersibility and a uniformity after curing, it is preferred that the component (B) have, per each molecule, at least 1 fluorine-containing organic group, more preferably 1 to 10 fluorine-containing organic groups. As such fluorine-containing organic group(s), it is preferred that the component (B) have, per each molecule, at least one fluorine-containing group such as a monovalent perfluoroalkyl group, monovalent perfluorooxyalkyl group, divalent perfluoroalkylene group or divalent perfluorooxyalkylene group.

As such monovalent or divalent fluorine-containing organic group, there may be listed, for example, a perfluoroalkyl group, perfluorooxyalkyl group, perfluoroalkylene group and perfluorooxyalkylene group represented by the following formulae.

(In these formulae, g is an integer of 1 to 20, preferably an integer of 2 to 10.)

[Chemical formula 14]

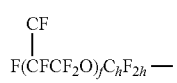

(In this formula, f is an integer of 1 to 200, preferably an integer of 1 to 100; h is an integer of 1 to 3.)

[Chemical formula 15]

(In this formula, each of i and j is an integer of not smaller than 1, preferably an integer of 1 to 100; an average of i+j is 2 to 200, preferably 2 to 100.)

(In this formula, each of d and e represents an integer of 1 to 50, preferably an integer of 1 to 40.)

Further, it is preferred that these perfluoroalkyl group, perfluorooxyalkyl group, perfluoroalkylene group or perfluorooxyalkylene group are each bonded to a silicon atom via a divalent linking group; examples of such divalent linking group include an alkylene group, an arylene group as well as a combination thereof, or those with an ether bond (oxygen atom), an amide bond, a carbonyl bond, an ester bond, a diorganosilylene group or the like being present in these alkylene and arylene groups. For example, the divalent linking group may include, but is not limited to the following divalent linking groups each having 2 to 13 carbon atoms.

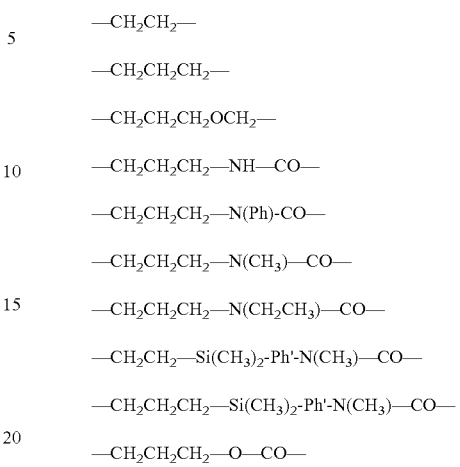

(In these formulae, Ph represents a phenyl group, Ph' represents a phenylene group.)

Further, as a silicon atom-bonded monovalent substituent group in the fluorine-containing organohydrogenpolysiloxane as the component (B) other than the aforementioned monovalent or divalent fluorine-containing organic groups and the silicon atom-bonded hydrogen atoms, there may be listed, for example, an alkyl group such as a methyl group, an ethyl group, a propyl group, a butyl group, a hexyl group, a cyclohexyl group, an octyl group and a decyl group; an alkenyl group such as a vinyl group and an allyl group; an aryl group such as a phenyl group, a tolyl group and a naphthyl group; an aralkyl group such as a benzyl group and a phenylethyl group; and a substituted or unsubstituted monovalent hydrocarbon group having 1 to 20, preferably 1 to 12 carbon atoms, such as a chloromethyl group, a chloropropyl group and a cyanoethyl group that are obtained by substituting part of or all the hydrogen atoms in any of the above groups with, for example, chlorine atoms and cyano groups.

The fluorine-containing organohydrogenpolysiloxane as the component (B) may be either cyclic, linear, branched or three-dimensionally networked, or a combination thereof. There are no particular restrictions on the number of the silicon atoms in this fluorine-containing organohydrogenpolysiloxane; normally, the number of the silicon atoms is about 2 to 60, preferably 3 to 30.

As such component (B) having the monovalent or divalent fluorine-containing organic groups and the silicon atom-bonded hydrogen atoms, there may be listed, for example, the following compounds. Any one of these compounds may be used alone, or two or more of them may be used in combination. Here, in the following formulae, Me represents a methyl group, Ph represents a phenyl group.

[Chemical formula 16]

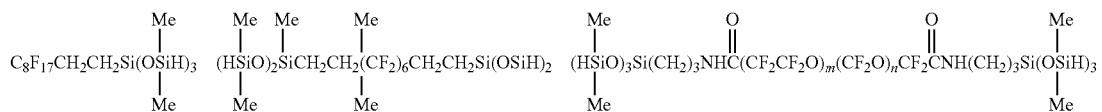

m = 10, n = 6

-continued
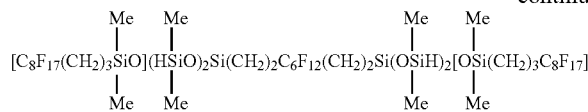
[Chemical formula 17]
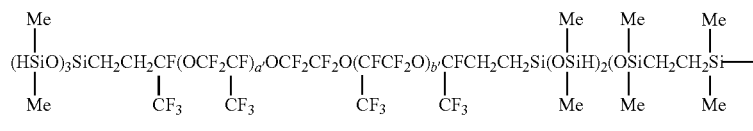
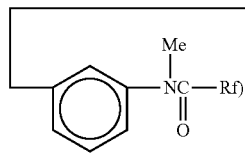
$a' + b' = 3$  Rf: F—(CFCF$_2$O)$_n$—CF—  n = 24
$a' = 1$ or 2  $b' = 1$ or 2    CF$_3$     CF$_3$
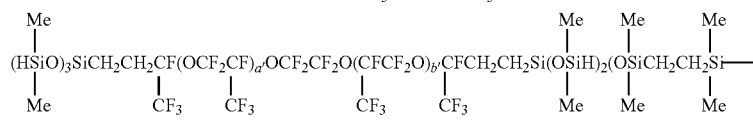
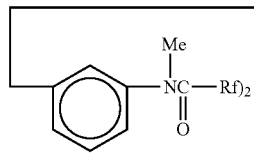
$a' + b' = 2$  Rf: F—(CFCF$_2$O)$_n$—CF—  n = 50
                        CF$_3$     CF$_3$
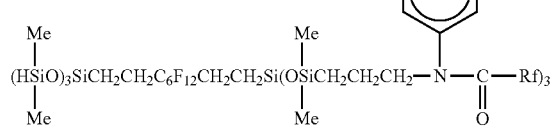
Rf: F—(CFCF$_2$O)$_n$—CF—  n = 30
       CF$_3$     CF$_3$
[Chemical formula 18]
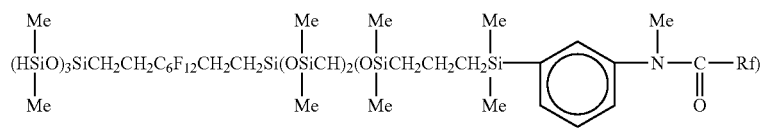
Rf: F—(CFCF$_2$O)$_n$—CF—  n = 24
       CF$_3$     CF$_3$
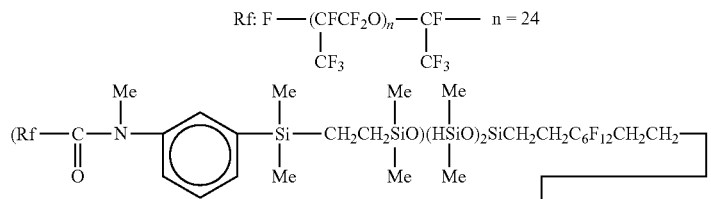
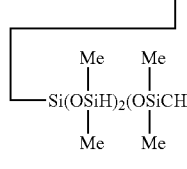
Rf: F—(CFCF$_2$O)$_n$—CF—  n = 24
       CF$_3$     CF$_3$

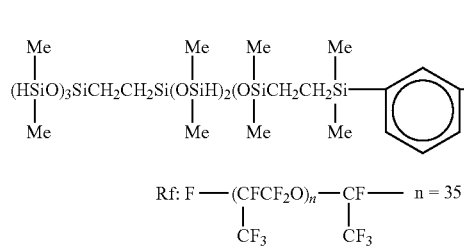
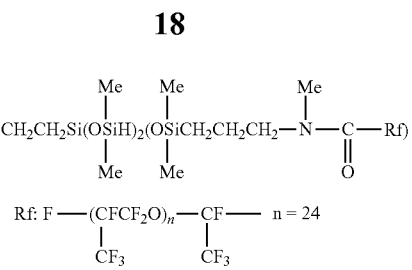
[Chemical formula 19]
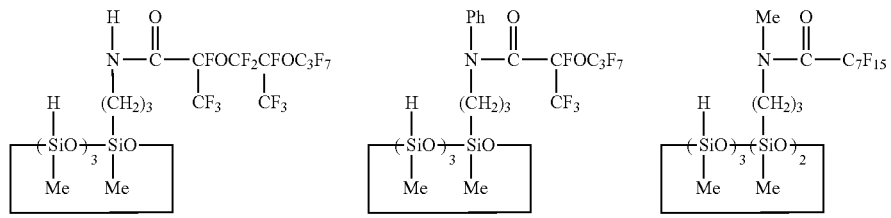
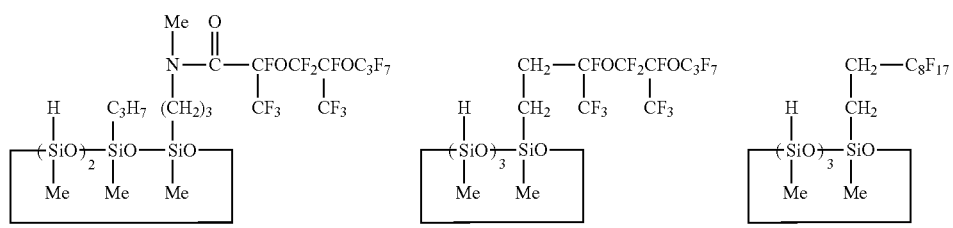
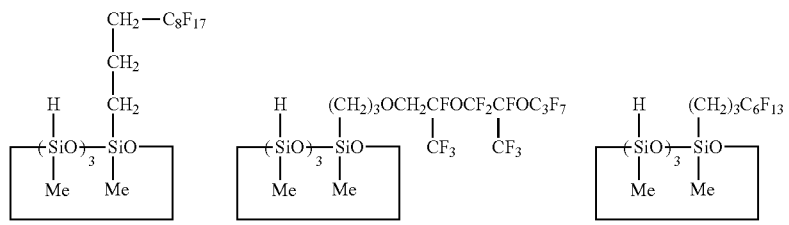
[Chemical formula 20]
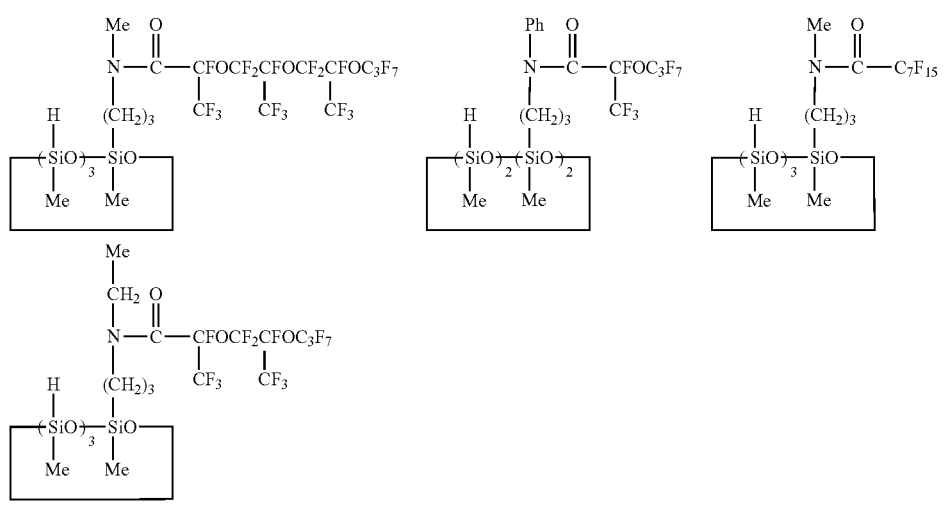

-continued
[Chemical formula 21]
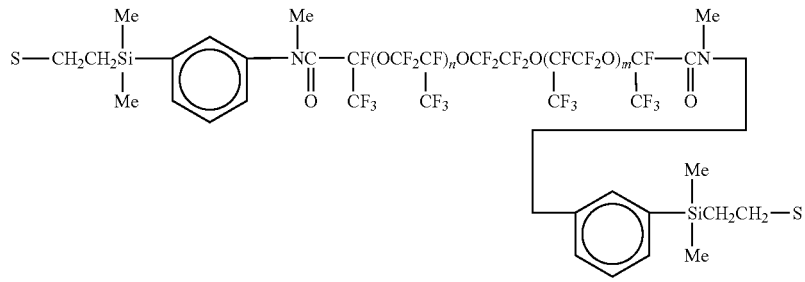
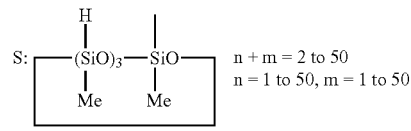
n + m = 2 to 50
n = 1 to 50, m = 1 to 50
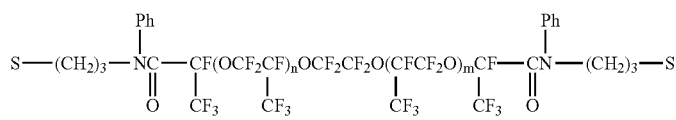
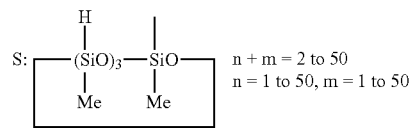
n + m = 2 to 50
n = 1 to 50, m = 1 to 50
[Chemical formula 22]
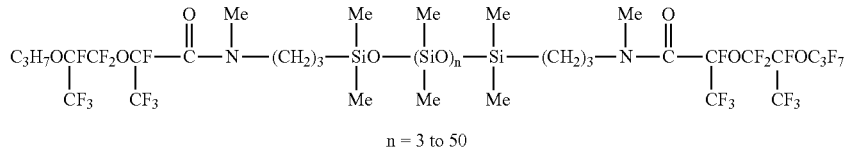
n = 3 to 50
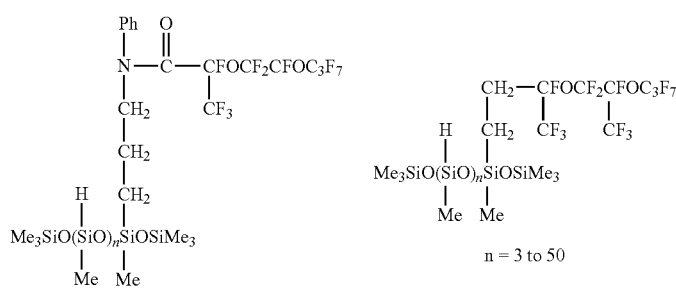
[Chemical formula 23]
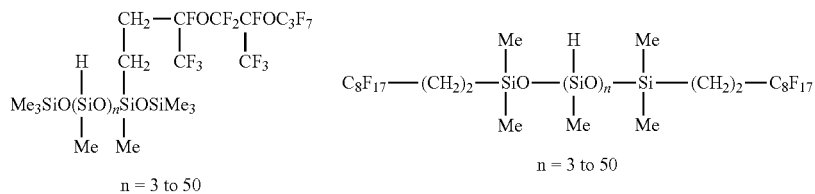
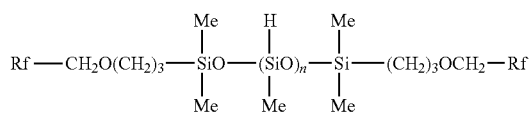
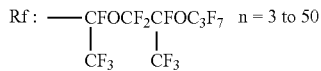

[Chemical formula 24]

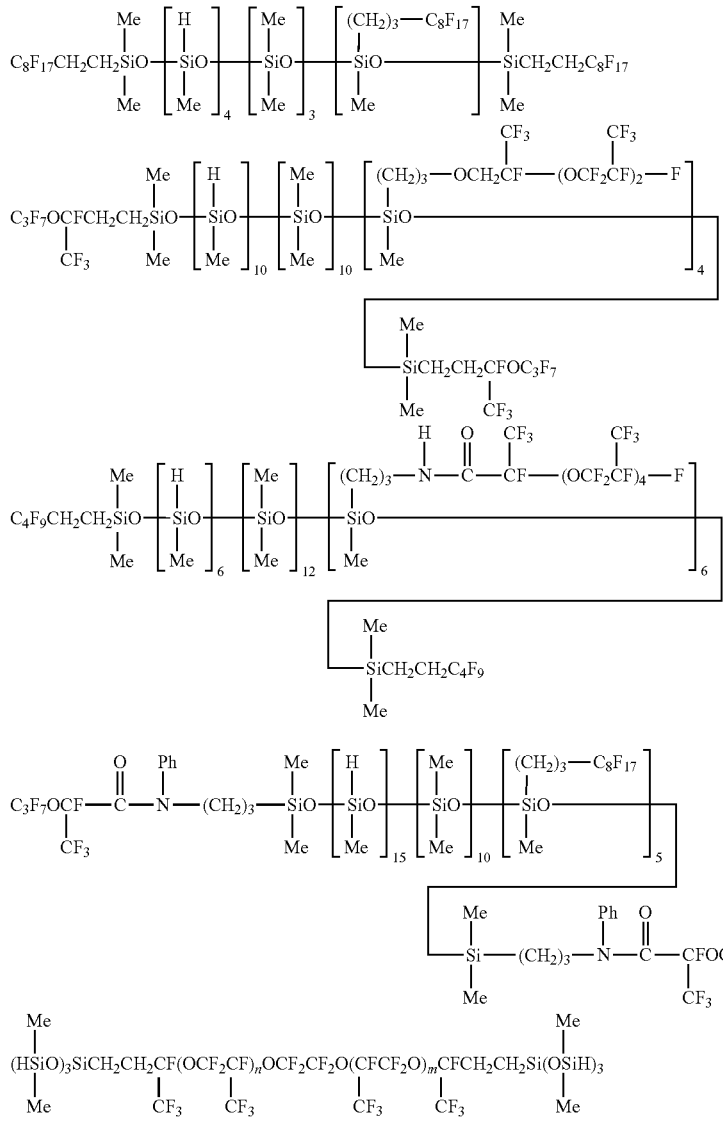

[Chemical formula 25]

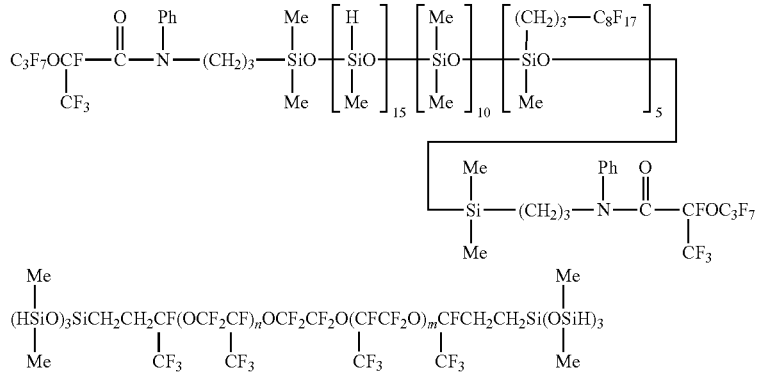

n + m = 2 to 50
n = 1 to 50, m = 1 to 50

It is preferred that the Si—H groups be contained in the fluorine-containing organohydrogenpolysiloxane as the component (B) by an amount of 0.00050 to 0.01000 mol/g, more preferably 0.00100 to 0.00800 mol/g. When the amount of the Si—H groups contained in the fluorine-containing organohydrogenpolysiloxane is too small, an insufficient cross-linking density may be observed such that the physical properties of the cured product obtained may be impaired. Further, when the amount of the Si—H groups contained in the fluorine-containing organohydrogenpolysiloxane as the component (B) is too large, foaming may take place at the time of curing, or the physical properties of the cured product obtained may drastically change over time.

Any one of these fluorine-containing organohydrogenpolysiloxanes may be used alone, or two or more of them may be used in combination.

It is preferred that the component (B) be added in an amount at which the hydrosilyl groups in the component (B) i.e. Si—H groups will be in an amount of 0.5 to 3.0 mol, particularly 0.8 to 2.0 mol, per 1 mol of the alkenyl groups contained in the component (A) such as a vinyl group, allyl group and cycloalkenyl group. When the amount of the hydrosilyl groups (≡Si—H) is too small, an insufficient cross-linking density will be observed, which, as a result, may make it impossible to obtain the cured product. Further, when the amount of the hydrosilyl groups (≡Si—H) is too large, foaming may take place at the time of curing.

Here, the fluorine-containing organohydrogenpolysiloxane as the component (B) shall be clearly distinguished from a later-described organohydrogensiloxane as an adhesion improving agent and as a component (F) in that the fluorine-containing organohydrogenpolysiloxane as the component (B) does not contain an epoxy group and trialkoxysilyl group in the molecule.

[Component (C)]

A component (C) is a photoactive hydrosilylation reaction catalyst. A photoactive hydrosilylation reaction catalyst is a catalyst for promoting an addition reaction between the alkenyl groups in the component (A) and the hydrosilyl groups in the component (B), when activated as a result of being irradiated with a light, particularly an ultraviolet of 300 to 400 nm. Examples of such photoactive hydrosilylation reaction catalyst mainly include a platinum group-based metal catalyst and a nickel-based metal catalyst, of which examples of a platinum group-based metal catalyst include a platinum-based, a palladium-based and a rhodium-based metal complex compound(s), and examples of a nickel-based metal catalyst include a nickel-based, an iron-based and a cobalt-based metal complex compound(s). Particularly, a platinum-based metal complex compound is preferable, because it is relatively easily obtainable and exhibits a favorable catalytic activity.

Examples of a photoactive platinum-based metal complex compound include a ($\eta^5$-cyclopentadienyl)tri($\sigma$-alkyl)platinum complex compound and a $\beta$-diketonato platinum complex compound, specific examples of which include (methylcyclopentadienyl)trimethyl platinum (IV), (cyclopentadienyl)trimethyl platinum (IV), (1,2,3,4,5-pentamethylcyclopentadienyl)trimethyl platinum (IV), (cyclopentadienyl)dimethylethyl platinum (IV), (cyclopentadienyl)dimethylacetyl platinum (IV), (trimethylsilylcyclopentadienyl)trimethyl platinum (IV), (methoxycarbonylcyclopentadienyl)trimethyl platinum (IV), (dimethylphenylsilylcyclopentadienyl)trimethylcyclopentadienyl platinum (IV), trimethyl(acetylacetonato) platinum (IV), trimethyl(3,5-heptanedionate) platinum (IV), trimethyl(methylacetoacetate) platinum (IV), bis(2,4-pentanedionato) platinum (II), bis(2,4-hexanedionato) platinum (II), bis(2,4-heptanedionato) platinum (II), bis(3,5-heptanedionato) platinum (II), bis(1-phenyl-1,3-butanedionato) platinum (II), bis(1,3-diphenyl-1,3-propanedionato) platinum (II) and bis(hexafluoroacetylacetonato) platinum (II).

As for the usage of these catalysts, while they may be used in the form of a solid if they are solid catalysts, it is preferred that these catalysts be dissolved in an appropriate solvent at first and then in the fluoropolyether compound as the component (A) before use so as to obtain a more uniform cured product.

There are no particular restrictions on the type of the solvent used so long as the solvent is capable of dissolving the catalyst. However, it is preferred, in terms of a capability of more uniformly dispersing the catalyst in the composition, that there be used a solvent in which part of the hydrogens in the hydrocarbon groups have been substituted by fluorine; or a mixed solvent of a solvent in which part of the hydrogens in the hydrocarbon groups have been substituted by fluorine and a solvent in which all the hydrogens in the hydrocarbon groups have been substituted by fluorine.

As a solvent in which part of the hydrogens in the hydrocarbon groups have been substituted by fluorine, there may be listed, for example, 1,3-bis(trifluoromethyl)benzene, 1,2-bis(trifluoromethyl)benzene, 1,4-bis(trifluoromethyl)benzene, 1-methyl-3-(pentafluoroethyl)benzene, 1,1,1-trifluoro-3-[3-(trifluoromethyl)phenyl]propan-2-one, methyl 4-fluoro-3-(trifluoromethyl)benzoate, n-butyl heptafluorobutyrate, ethyl 3,5-bis(trifluoromethyl)benzoate, 2-methyl-5-(trifluoromethyl)benzaldehyde and 2,3-dimethoxybenzotrifluoride.

Further, as a solvent in which all the hydrogens in the hydrocarbon groups have been substituted by fluorine, there may be listed, for example, octafluorotoluene, (1,1,2,3,3,3-hexafluoropropoxy)perfluorobenzene, pentafluoroethyl 2,2,2-trifluoroethyl ether, Fluorinert (by 3M Company), PF5060 (by 3M Company) and perfluoropolyether oligomer.

If using the catalyst as a solution, a preferable mixing ratio between the linear polyfluoro compound as the component (A) and the catalyst solution is in a range of 100:0.01 to 1.00 (mass ratio). When the amount of the catalyst solution added is larger than this range, the properties of the cured product may be impacted; when the amount of the catalyst solution added is smaller than this range, a dispersion failure in the composition may be incurred. Thus, adjustments are to be appropriately made so that the concentration of the catalyst solution will fall into this range of mixing ratio.

It is preferred that the component (C) be added in an amount of 0.1 to 500 ppm, particularly preferably 1 to 100 ppm, in terms of mass of metal atoms with respect to the component (A). When the amount of the component (C) added is too small, a sufficient photocurability may not be achieved; when the amount of the component (C) added is too large, the heat resistance of the cured product may be negatively impacted.

[Component (D)]

A zeolite as a component (D) is a crystalline zeolite having microscopic pores of a molecular diameter level, and has a characteristic of inhibiting foaming in the system by allowing microscopic molecules to be introduced into these pores. In the present invention, by employing such component (D) as an essential component, and adding it to the composition in advance, it is possible to obtain, after carrying out UV irradiation on the composition, a favorable cured product with no foaming observed in the composition as a result of trapping hydrogens that have occurred by a dehydrogenation reaction derived from the component (B), while maintaining a favorable curability and adhesiveness.

Zeolite is a collective term for aluminosilicate, aluminophosphate or silicoaluminophosphate; there are various grades depending on the size of the microscopic pores therein. In terms of adsorbing the hydrogens that have occurred by dehydrogenation, preferred is, though not limited thereto, an aluminosilicate of 3A or 4A grade (A-type zeolite with pore size of 3 Å or A-type zeolite with pore size of 4 Å).

In order to obtain a room temperature-curable fluoropolyether composition capable of inhibiting foaming without impairing a conventional curing property and post-curing properties, it is required that an average primary particle size of the zeolite as the component (D) be not larger than 30 m, particularly preferably 15 nm to 20 μm. When the average primary particle size of the zeolite is larger than 30 m, a light permeability in a deep region when irradiated with UV will be impaired such that there may be incurred an unfavorable condition where, for example, the post-curing properties will be negatively impacted.

The average primary particle size of the component (D) is obtained in such a way that in a particle observation using a scanning electron microscope (SEM), the particle sizes of 30 or more arbitrarily selected primary particles are measured, followed by averaging (number average) the particle sizes of these primary particles. There, the particle size is the diameter of a circle having an area equivalent to a projected area of a particle (equivalent circle diameter).

The component (D) is added in an amount of 0.1 to 20 parts by mass, preferably 0.5 to 10 parts by mass, per 100 parts by mass of the component (A). When the amount of the component (D) added is smaller than such amount, a favorable foaming inhibition effect cannot be imparted. In contrast, when the amount of the component (D) added is larger than the above amount, there will be incurred unfavorable conditions where, for example, a poor workability will be observed due to an increased viscosity, and the post-curing properties will be negatively impacted.

[Component (E)]

A hydrophobic silica powder as a component (E) is an optional component that may be added to the composition of the present invention if necessary, and has a function of imparting a proper physical strength to the cured product of the photocurable fluoropolyether-based elastomer composition, and uniformly dispersing a later-described organohydrogen siloxane as a component (F) in such composition. As such hydrophobic silica powder as the component (E), preferred are those prepared by hydrophobizing a fine powder silica having a BET specific surface area of not smaller than 50 m$^2$/g, particularly 50 to 400 m$^2$/g, such fine powder silica being known as a filler for silicone rubbers.

Examples of the fine powder silica include an aerosol silica (fumed silica or dry silica), a precipitated silica (wet silica) and a colloid silica, among which an aerosol silica is most preferred.

When the BET specific surface area is smaller than 50 m$^2$/g, the cured product obtained may exhibit an insufficient physical strength, and the component (F) may not be uniformly dispersed. When the BET specific surface area is larger than 400 m$^2$/g, a kneading operation may become difficult such that the component (E) itself may be ununiformly dispersed. Here, the BET specific surface area in the present invention is measured in accordance with DIN 66131.

Further, as a hydrophobizing agent for treating the fine powder silica, there may be listed, for example, an organochlorosilane, an organodisilazane, a cyclic organopolysilazane and a linear organopolysiloxane, among which an organochlorosilane, an organodisilazane and a cyclic organopolysilazane are preferred.

If the component (E) is to be added to the composition of the present invention, it is preferably added in an amount of 0.5 to 30 parts by mass, more preferably 1 to 25 parts by mass, per 100 parts by mass of the component (A). When the amount of the component (E) added is smaller than 0.5 parts by mass, there may not be achieved the effects brought about by adding the same. Meanwhile, when the amount of the component (E) added is larger than 30 parts by mass, the fluidity of the composition may worsen, and a photocurability may be impaired significantly as well.

[Component (F)]

An organohydrogen siloxane as a component (F) is an optional component that may be added to the composition of the present invention if necessary, and is added as an adhesiveness imparting agent for improving an adhesiveness of the cured product obtained by curing the composition of the present invention to various base materials. Such organohydrogen siloxane as the component (F) has, per each molecule, at least one silicon atom-bonded hydrogen atom and at least one epoxy and/or trialkoxysilyl group bonded to the silicon atom via a carbon atom or carbon and oxygen atoms; and is preferably a fluorine-containing organohydrogen siloxane further having at least one monovalent perfluoroalkyl or perfluorooxyalkyl group bonded to the silicon atom via a divalent linking group containing a silicon atom-bonded carbon atom(s) or carbon and oxygen atoms. Here, the component (F) shall be clearly distinguished from the aforementioned component (B) in that the component (F) essentially contains, in its molecule, the epoxy and/or trialkoxysilyl group(s).

The siloxane frame of such organohydrogen siloxane may be any of, for example, cyclic, chainlike or branched, or a mixture thereof.

Specifically, there may be used those represented by the following average composition formulae.

[Chemical formula 26]

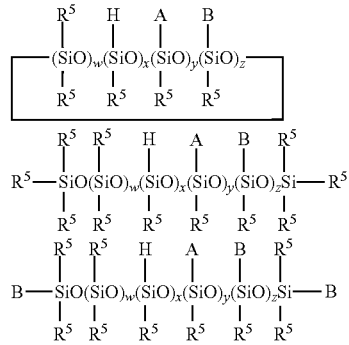

(In the above formulae, R$^5$ independently represents an unsubstituted or halogen-substituted monovalent hydrocarbon group; A and B are described below. w, x, y and z are such that 0≤w≤100, 1≤x≤100, 1≤y≤100, and 0≤z≤100.)

As the halogen-substituted or unsubstituted monovalent hydrocarbon group represented by R$^5$, those having 1 to 10, particularly 1 to 8 carbon atoms are preferred, specific examples of which include an alkyl group such as a methyl group, an ethyl group, a propyl group, a butyl group, a hexyl group, a cyclohexyl group and an octyl group; an aryl group such as a phenyl group and a tolyl group; an aralkyl group such as a benzyl group and a phenylethyl group; and a monovalent hydrocarbon group obtained by substituting part of or all the hydrogen atoms in any of the abovementioned groups with halogen atoms such as fluorine atoms. Particularly, a methyl group is preferred.

It is preferred that w, x, y and z are such that 0≤w≤20, 1≤x≤20, 1≤y≤20, 1≤z≤20, and 3≤w+x+y+z≤50.

A represents an epoxy and/or trialkoxysilyl group bonded to the silicon atom via a carbon atom or carbon and oxygen atoms, specific examples of which may include the following groups.

[Chemical formula 27]

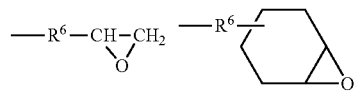

[In these formulae, R$^6$ represents a divalent hydrocarbon group that may contain an oxygen atom(s), and has 1 to 10, particularly 1 to 5 carbon atoms (e.g. alkylene group, cycloalkylene group).]

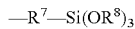

[In this formula, R$^7$ represents a divalent hydrocarbon group having 1 to 10, particularly 1 to 4 carbon atoms (e.g. alkylene group); R$^8$ represents a monovalent hydrocarbon group having 1 to 8, particularly 1 to 4 carbon atoms (e.g. alkyl group).]

[Chemical formula 28]

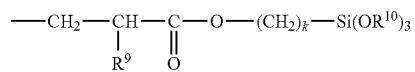

[In this formula, $R^9$ represents a monovalent hydrocarbon group having 1 to 8, particularly 1 to 4 carbon atoms (e.g. alkyl group); $R^{10}$ represents a methyl group or an ethyl group; k is an integer of 2 to 10.]

B represents a monovalent perfluoroalkyl or perfluorooxyalkyl group bonded to the silicon atom via a carbon atom or carbon and oxygen atoms. Examples of the monovalent perfluoroalkyl or perfluorooxyalkyl group may include those represented by the following general formulae.

$$C_{g'}F_{2g'+1}-$$

(In this formula, g' is an integer of 1 to 20, preferably 2 to 10.)

$$F-[CF(CF_3)CF_2O]_{f'}-C_{h'}F_{2h'}-$$

(In this formula, f' is an integer of 2 to 200, preferably 2 to 100; h' is an integer of 1 to 3.)

As the divalent linking group containing carbon atoms or carbon and oxygen atoms, there may be employed, for example, an alkylene group, an arylene group and a combination(s) thereof, or those with, for example, an ether bond (—O—), amide bond and/or carbonyl bond being present in the above groups; for example, there may be listed the following divalent linking groups having 2 to 12 carbon atoms.

—CH$_2$CH$_2$—

—CH$_2$CH$_2$CH$_2$—

—CH$_2$CH$_2$CH$_2$OCH$_2$—

—CH$_2$CH$_2$CH$_2$—NH—CO—

—CH$_2$CH$_2$CH$_2$—N(CH$_3$)—CO—

—CH$_2$CH$_2$CH$_2$—N(Ph)-CO—

(Provided that Ph represents a phenyl group.)

These organohydrogen siloxanes can be obtained by reacting an organohydrogen siloxane having at least three silicon atom-bonded hydrogen atoms (Si—H groups) per each molecule with a compound containing an aliphatic unsaturated group such as a vinyl group and an allyl group, and containing an epoxy group and/or a trialkoxysilyl group, and further with, if necessary, a compound containing an aliphatic unsaturated group and a perfluoroalkyl group or perfluorooxyalkyl group, by a partial addition reaction in accordance with a common method. Here, the number of the aliphatic unsaturated groups needs to be smaller than that of the Si—H groups.

As for the production of such organohydrogen siloxane, the target substance may be isolated after the reaction is over, or there may also be used a mixture prepared by simply removing an unreacted substance(s) and an addition reaction catalyst.

Specific examples of the organopolysiloxane as the component (F) include those represented by the following structural formulae. Here, in the following formulae, Me represents a methyl group, Ph represents a phenyl group.

[Chemical formula 29]

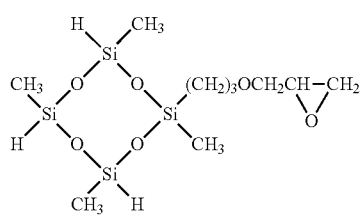

[Chemical formula 30]

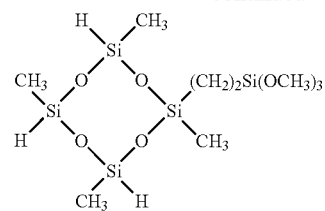

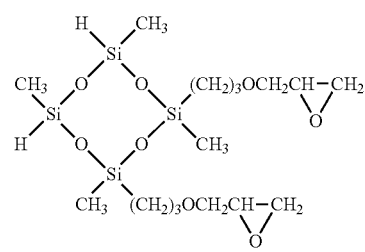

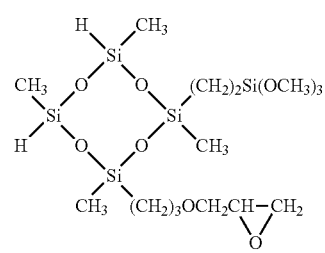

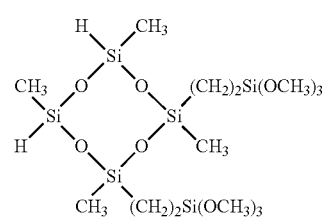

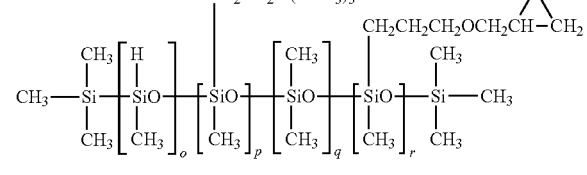

(Each of o, q and r is a positive integer; p is an integer of not smaller than 0.)

[Chemical formula 31]
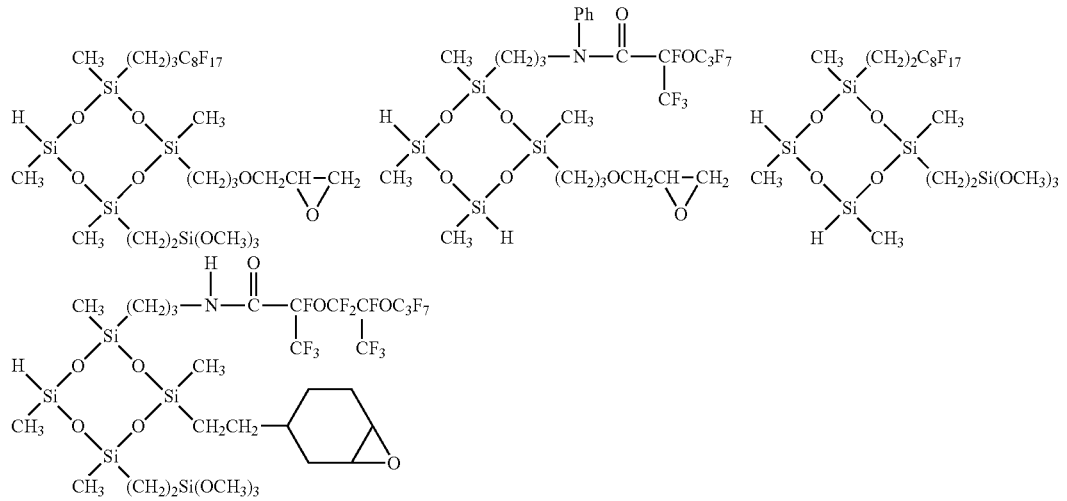
[Chemical formula 32]
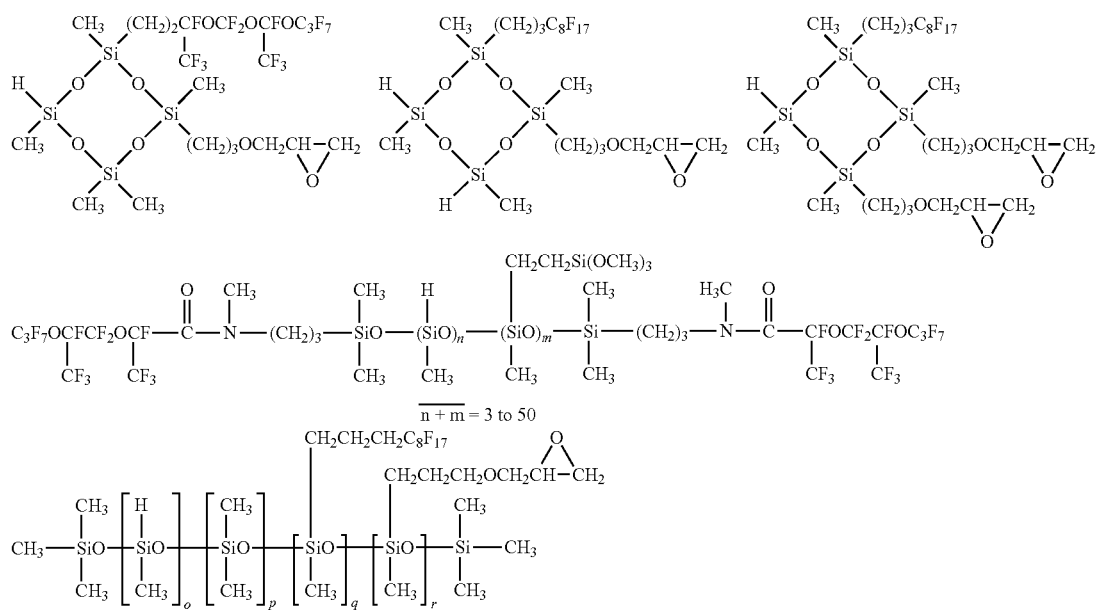
(Each of o, q and r is a positive integer; p is an integer of not smaller than 0.)
[Chemical formula 33]
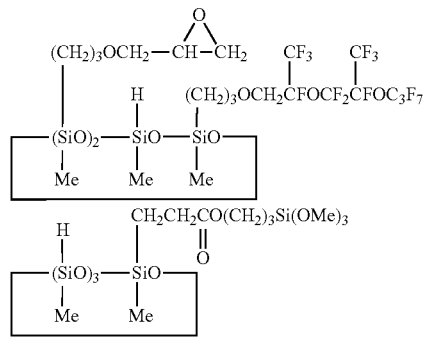
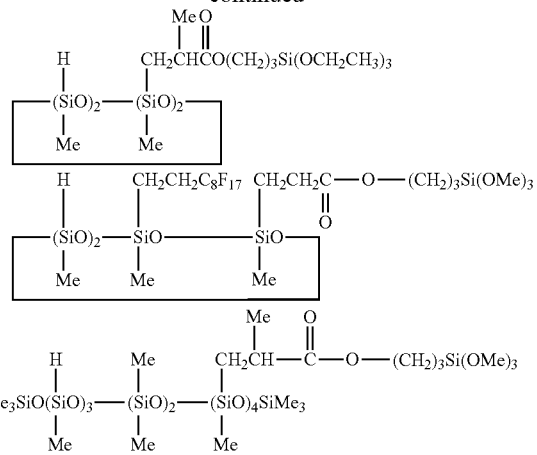

-continued

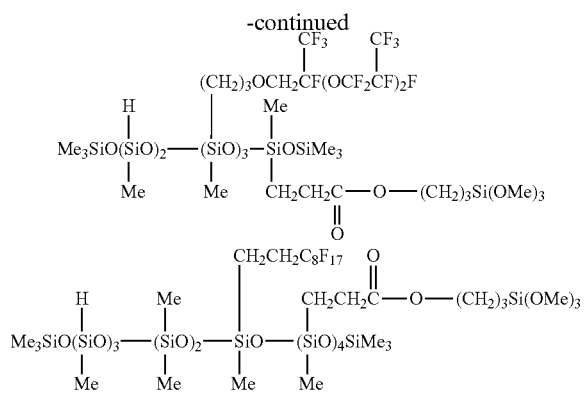

As for the component (F), one kind thereof may be used alone, or two or more kinds thereof may be used in combination.

If the component (F) is to be added to the composition of the present invention, it is used in an amount of 0.05 to 5.0 parts by mass, preferably 0.1 to 3.0 parts by mass, per 100 parts by mass of the component (A). When the amount of the component (F) added is smaller than 0.05 parts by mass, there may not be achieved the effects brought about by adding the same; when the amount of the component (F) added is larger than 5.0 parts by mass, the fluidity of the composition may worsen, the physical strengths of the cured product obtained may be impaired, and a curability may be inhibited as well.

Further, it is preferred that the component (F) be used in an amount where a molar ratio of a total of the hydrosilyl groups (Si—H groups) contained in the whole composition to a total of the silicon atom-bonded alkenyl groups contained in the whole composition (particularly, the silicon atom-bonded alkenyl groups in the component (A)), especially a molar ratio of a total of the Si—H groups in the components (B) and (F) to the silicon atom-bonded alkenyl groups in the component (A) (Si—H group/alkenyl group) becomes 0.5 to 3.0 mol/mol, particularly 0.8 to 2.0 mol/mol. When the amount of the hydrosilyl groups (Si—H groups) contained in the whole composition is smaller than the above molar ratio, the cured product may not be obtained, and a desired adhesiveness may not be achieved, due to an insufficient crosslinking density. In contrast, when the amount of the hydrosilyl groups (Si—H groups) contained in the whole composition is larger than the above molar ratio, foaming will take place in a significant manner due to the dehydrogenation reaction such that a cured product with a smooth surface may not be obtained.

[Component (G)]

A reaction control agent for hydrosilylation reaction as a component (G) is an optional component that may be added to the composition of the present invention if necessary. Here, examples of the reaction control agent as the component (G) include an acetylene alcohol such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; an acetylene compound such as 3-methyl-3-penten-1-yne and 3,5-dimethyl-3-hexen-1-yne; fluorine-containing acetylene alcohol compounds represented by the structural formulae shown below; a polymethylvinylsiloxane cyclic compound; and an organic phosphorus compound.

[Chemical formula 34]

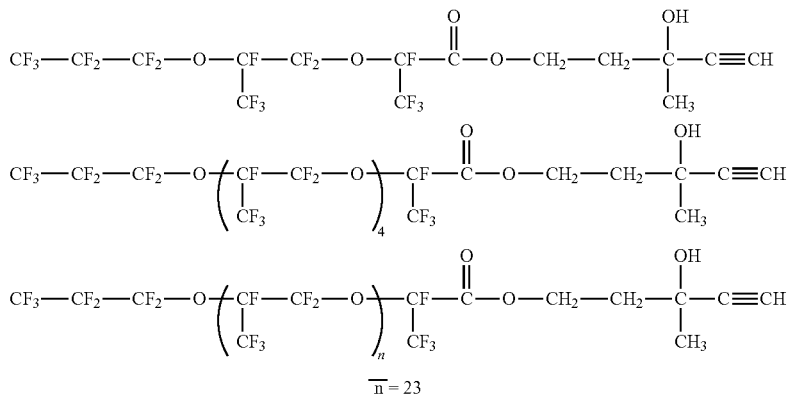

[Chemical formula 35]

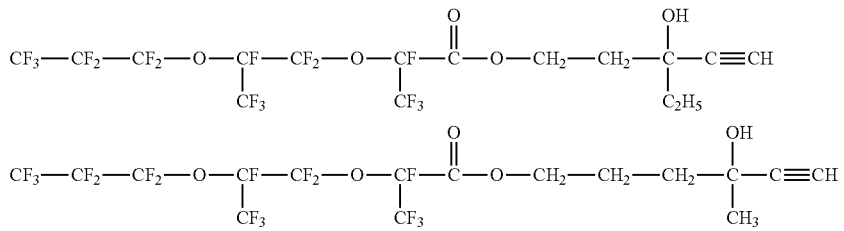

[Chemical formula 36]

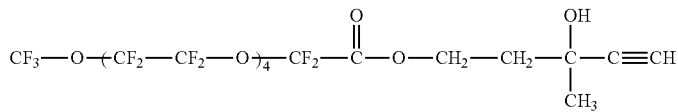

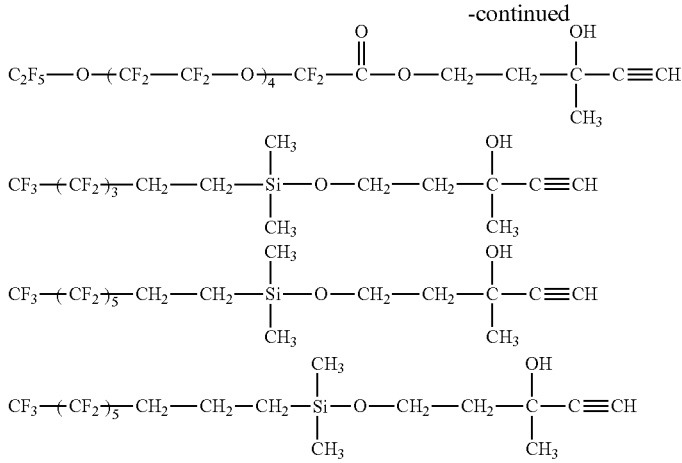

[Chemical formula 37]

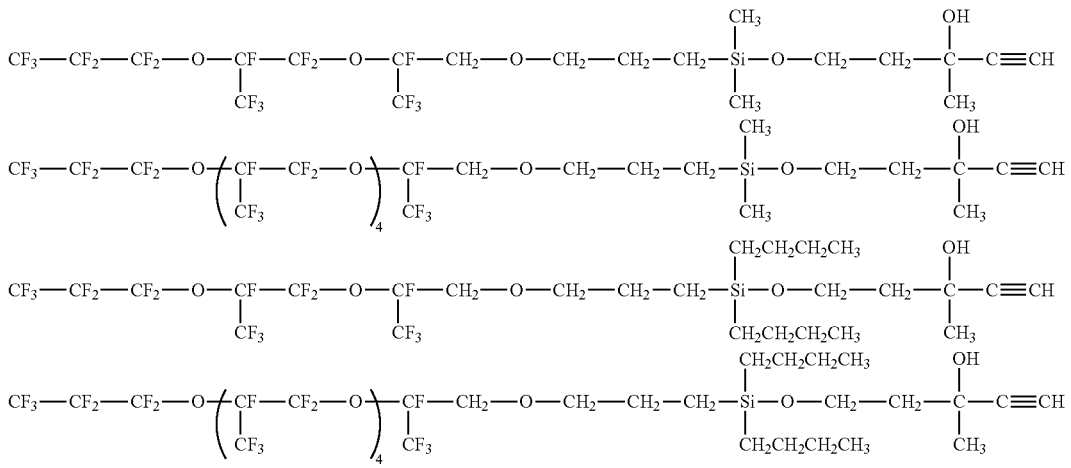

[Chemical formula 38]

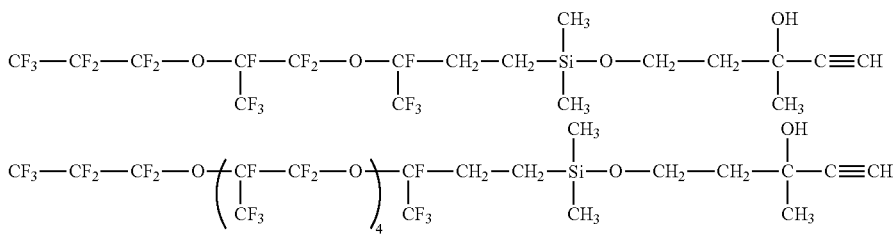

In terms of usage of these reaction control agents, they may be dissolved in an appropriate solvent such as toluene before use. Further, since these reaction control agents vary in control capability depending on their chemical structures, an addition amount thereof shall each be adjusted to the most appropriate amount. In general, when the amount of the reaction control agent added is too small, there may not be achieved a long-term preservation stability under room temperature; when the amount of the reaction control agent added is too large, curing will take place in a sluggish manner such that a satisfactory curability may not be achieved.

If the component (G) is to be added to the composition of the present invention, it is used in an amount of 0.01 to 0.5 parts by mass, particularly preferably 0.02 to 0.3 parts by mass, per 100 parts by mass of the component (A).

[Other Components]

In addition to the abovementioned components, various compounding agents may also be added to the photocurable fluoropolyether-based elastomer composition if necessary for the purpose of improving the practicality thereof, examples of such compounding agents include a plasticizer, a viscosity adjuster, a flexibility imparting agent, an inorganic filler other than the components (D) and (E), an adhesion promotor and a silane coupling agent. The amount(s) of these additives added are arbitrary provided that the purpose of the present invention will not be impaired, and that the properties of the composition as well as the properties of the cured product will not be impaired.

As a plasticizer, a viscosity adjuster and a flexibility imparting agent, there may be used in combination a polyfluoromonoalkenyl compound represented by the following formula (3) and/or a linear or side chain-containing polyfluoro compound represented by the following formula (4), (5) or (6).

$$Rf^3—(X')_aCH=CH_2 \quad (3)$$

[In the formula (3), the definition of X' is identical to that in the formula (1) representing the compound as the component (A); a is 0 or 1; $Rf^3$ is a group represented by the following formula (iii).

[Chemical formula 39]

$$F(CFCF_2O)_{f1}C_tF_{2t}—$$
with $CF_3$ branch (In this formula, f1 is an integer of not smaller than 1, preferably an integer of 2 to 100; t is an integer of 1 to 3; and f1 is smaller than each of a sum of p+q (average) and r and a sum of u and v with regard to the $Rf'$ group of the component (A).)]

$$D_1\text{-}(CF_2CF_2CF_2O)_{c1}\text{-}D_2 \quad (4)$$

(In this formula, each of $D_1$ and $D_2$ independently represents a group expressed by a formula, $C_sF_{2s+1}$— (s is 0 to 3); c1 is an integer of 1 to 200, preferably an integer of 2 to 100, and is smaller than each of the sum of p+q (average) and r and the sum of u and v with regard to the $Rf'$ group of the component (A).)

$$D_3\text{-}O\text{—}(CF_2O)_{d1}(CF_2CF_2O)_{e1}\text{-}D_3 \quad (5)$$

(In this formula, $D_3$ represents a group expressed by a formula, $C_wF_{2w+1}$— (w is 0 to 3); each of d1 and e1 is an integer of 1 to 200, preferably an integer of 1 to 100; and a sum of d1 and e1 is not larger than each of the sum of p+q (average) and r and the sum of u and v with regard to the $Rf'$ group of the component (A).)

$$D_3\text{-}O\text{—}(CF_2)_{f1}[CF_2CF(CF_3)O]_{g1}\text{-}D_3 \quad (6)$$

(In this formula, $D_3$ is defined as above; each of f1 and g1 is an integer of 1 to 200, preferably an integer of 1 to 100; and a sum of f1 and g1 is not larger than each of the sum of p+q (average) and r and the sum of u and v with regard to the $Rf'$ group of the component (A).)

Specific examples of the polyfluoromonoalkenyl compound represented by the formula (3) are as follows (provided that f1' shown below satisfies the condition of the aforementioned f1).

[Chemical formula 40]

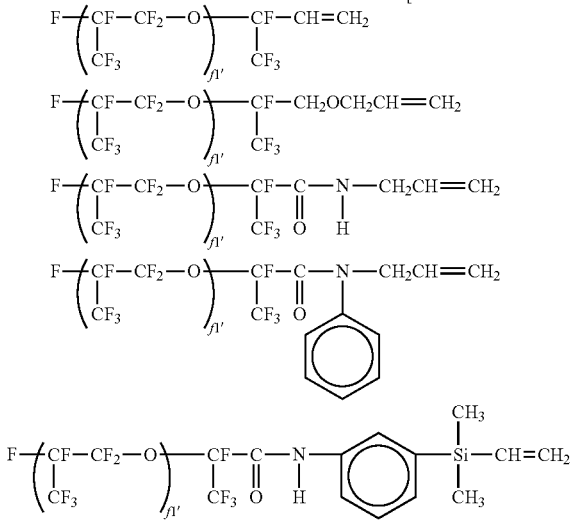

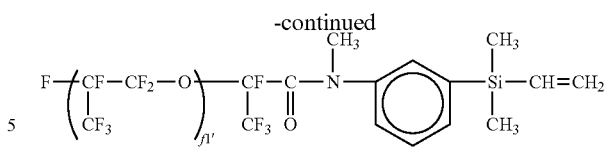

(In the above formulae, f1' is an integer of 1 to 100.)

Specific examples of the linear or side chain-containing polyfluoro compound represented by the formula (4), (5) or (6) are as follows (provided that c1', a sum of d1' and e1' and a sum of f1' and g1' respectively satisfy the condition of c1, the condition of the sum of d1 and e1 and the condition of the sum of f1 and g1).

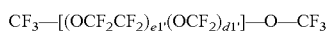

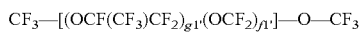

(In the above formulae, c1' is an integer of 1 to 200, d1' is an integer of 1 to 200, and e1' is an integer of 1 to 200, provided that d1'+e1'=2 to 200; f1' is an integer of 1 to 200, g1' is an integer of 1 to 200, provided that f1'+g1'=2 to 200.)

Further, for a similar reason as the linear fluoropolyether compound of the formula (1), it is desired that the viscosity (23° C.) of each of the compounds of the formulae (3) to (6) be in a range of 5 to 100,000 mPa s when measured by a rotary viscometer.

If adding the compounds of the formulae (3) to (6), it is preferred that they are added in an amount of 1 to 300 parts by mass, particularly preferably 50 to 250 parts by mass, per 100 parts by mass of the component (A) in the photocurable fluoropolyether-based elastomer composition.

As the inorganic filler other than the components (D) and (E), there may be added, for example, a reinforcing or semi-reinforcing filler such as a quartz powder, a fused quartz powder, a diatom earth and calcium carbonate; an inorganic pigment such as titanium oxide, iron oxide, carbon black and cobalt aluminate; a heat resistance improving agent such as iron oxide, carbon black, cerium oxide, cerium hydroxide, zinc carbonate, magnesium carbonate and manganese carbonate; a thermal conductivity imparting agent such as alumina, boron nitride, silicon carbide and a metal powder; and an electrical conductivity imparting agent such as carbon black, a silver powder and an electrically conductive zinc oxide.

Further, as an adhesiveness imparting agent other than the component (F), there may be added, for example, an adhesion promotor such as titanate ester; and a silane coupling agent such as epoxy group-containing silanes including 3-glycidoxypropyltrimethoxysilane, 3-glycidoxypropyltriethoxysilane, 3-glycidoxypropylmethyldimethoxysilane, 3-glycidoxypropylmethyldiethoxysilane and the like.

The photocurable fluoropolyether-based elastomer composition can be produced by uniformly mixing the components (A) to (G) and the other optional components, using a mixing device such as a planetary mixer, a Ross mixer or a Hobart mixer, and using, if necessary, a kneading device such as a kneader or a triple roll mill. Here, as for the components (D) and (E), in order to uniformly disperse each of the components (D) and (E) in the component (A), it is preferred that a base compound(s) be prepared in advance by uniformly and separately mixing each of the components (D) and (E) with the component (A), followed by mixing each base compound with the rest of the components. Further, when producing the composition, in order to remove the air that has been encapsulated in the composition as a result of possibly getting caught therein when performing mixing, it is preferred that a defoaming operation be carried out at the end of the production process by means of centrifugal separation or the like.

Bonding Method of Photocurable Fluoropolyether-Based Elastomer Composition

A bonding method of the photocurable fluoropolyether-based elastomer composition of the present invention (i.e. a method for bonding the cured product of the photocurable fluoropolyether-based elastomer composition to the surface of a base material) is comprised of the following three steps. That is, 1. At first, there is a step of modifying the surface of a base material by plasma irradiation.
2. Next, there is a step of applying the photocurable fluoropolyether-based elastomer composition to the base material whose surface has been modified, and then photocuring the composition.
3. In the end, there is a step of leaving a fluorine elastomer (cured product) obtained as above for a given period of time so as to bond such fluorine elastomer (cured product) to the base material. Each step is described in detail hereunder.

1. Step of Modifying Base Material Surface

In the beginning, the surface of a base material is to be modified by plasma irradiation under an oxygen-containing atmosphere. In the present invention, the surface modification method of the base material is performed by carrying out plasma irradiation under an oxygen-containing atmosphere. Here, in the cases of a metal base material and an inorganic base material such as glass and ceramics, surface modification of the base material by plasma irradiation is generally assumed to bring about an effect of decomposing and cleaning organic substances such as dirt and grease content; and in the case of an organic resin-made base material, in addition to the abovementioned cleaning effect, surface modification of the base material by plasma irradiation is in general assumed to bring about an effect of forming concavities and convexities on the surface of the base material by decomposing such resin surface, or an effect of forming polar groups such as carbonyl groups (hydrophilization effect).

Although not particularly limited, the base materials used in the present invention may be those made of, for example, a metal such as iron, aluminum and stainless steel; glass; ceramics; or a synthetic resin such as PPS, PBT, PET and nylon.

Further, in order to improve the effect of surface modification, it is preferred that the surface of the base material be subjected to, for example, a degreasing treatment using an organic solvent or the like and/or a prebaking treatment before performing the above plasma irradiation.

Plasma Treatment Method

As for a plasma treatment method used in the present invention, while either atmospheric- or low-pressure plasma treatment may be employed, it is required that such plasma treatment be at least performed in an oxygen-containing atmosphere; surface modification may be performed by generating plasmas preferably in the air, more preferably in an atmosphere of a gas (e.g. inert gas such as nitrogen gas and argon gas) containing oxygen.

When performing plasma treatment under atmospheric pressure, an irradiation distance is 3 mm to 10 cm, preferably 5 mm to 5 cm. It is not preferable when the irradiation distance is too close, because, for example, a workability may be impaired, and the base material may deteriorate, due to a narrow treatment area; it is also not preferrable when the irradiation distance is too far, because a modification efficiency will decrease such that a desired modification effect may not be achieved.

Further, an irradiation time in the case of atmospheric-pressure plasma is 1 to 120 sec, preferably 5 to 60 sec. If the irradiation time is shorter than the above time, a desired modification effect may not be achieved; in contrast, it is not preferable if the irradiation time is longer than the above time, because, for example, the workability may be impaired, and the base material may deteriorate.

If performing low-pressure plasma treatment, irradiation may be performed at a high-frequency output of 50 to 500 W for 5 to 120 sec, preferably at 100 to 300 W for 10 to 60 sec. Irradiation performed at a lower output for a shorter period of time may make it impossible to achieve a desired modification effect; irradiation performed at a higher output for a longer period of time is not preferable, because, for example, the workability may be impaired, and the base material may deteriorate.

2. Step of Photocuring Photocurable Fluoropolyether-Based Elastomer

Next, the photocurable fluoropolyether-based elastomer composition is to be applied to the base material surface that has been modified in the step 1. By performing light irradiation on such composition so as to cure the same, a fluorine-containing elastomer (cured product) will be obtained.

Here, when performing curing, it is preferred that a light used for irradiation be a near-ultraviolet light (which may simply be referred to as ultraviolet hereunder). Particularly, a maximum peak wavelength in the emission spectrum thereof is in a region of 300 to 400 nm, and the irradiance at each wavelength in a wavelength region shorter than 300 nm is not larger than 5%, preferably not larger than 1%, more preferably not larger than 0.1% of the irradiance at the maximum peak wavelength i.e. the closer it gets to 0, the more preferable. If performing irradiation with a light having a wavelength that is in a region shorter than 300 nm and whose irradiance is larger than 5% of the irradiance at the maximum peak wavelength, a satisfactory cured product may not be obtained as, for example, decomposition of polymer end group(s) occurs, or part of the catalyst decomposes.

While there are no particular restrictions on an active light ray species used to obtain the fluorine-containing elastomer by curing the photocurable fluoropolyether-based elastomer composition, an ultraviolet having the above wavelength is preferred. In terms of cumulative light intensity, an ultraviolet irradiation dose (illuminance) is preferably 1,000 to 50,000 mJ/cm$^2$, more preferably 2,000 to 20,000 mJ/cm$^2$, even more preferably 5,000 to 10,000 mJ/cm$^2$, which is desirable from the perspective of achieving a favorable curability. When the ultraviolet irradiation dose (illuminance) is lower than the above range, a cured product (fluorine-containing elastomer) having satisfactory properties (e.g. mechanical strengths) may not be obtained as there cannot be achieved a sufficient energy required to activate the photoactive hydrosilylation reaction catalyst in the composition. Meanwhile, when the ultraviolet irradiation dose (illuminance) is greater than the above range, the composition will be irradiated with an energy more than necessary such that decomposition of polymer end group(s) may occur, or part of the catalyst may be deactivated, whereby there may not be obtained a satisfactory cured product.

Ultraviolet irradiation may be performed with either a light having multiple emission spectra or a light having a single emission spectrum. Further, a single emission spectrum may be that having a broad spectrum in the region of 300 to 400 nm. A light having a single emission spectrum is a light having a peak (i.e. maximum peak wavelength) in the range of 300 to 400 nm, preferably a range of 350 to 380 nm. As a light source for emitting such light, there may be listed an ultraviolet light-emitting semiconductor element light source such as an ultraviolet light-emitting diode (ultraviolet LED) and an ultraviolet light-emitting semiconductor laser.

As a light source for emitting a light having multiple emission spectra, there may be listed, for example, a lamp such as a metal halide lamp, a xenon lamp, a carbon-arc lamp, a chemical lamp, a sodium lamp, a low-pressure mercury lamp, a high-pressure mercury lamp and an ultrahigh pressure mercury lamp; a gas laser such as a nitrogen laser; a liquid laser such as an organic dye solution laser; and a solid laser with rare-earth ions being contained in an inorganic single crystal.

It is preferred that lights having a wavelength from the wavelength region shorter than 300 nm be removed by an optical filter if the aforementioned light has a peak in the wavelength region shorter than 300 nm in the emission spectrum, or if there exists, in the wavelength region shorter than 300 nm, a wavelength having an irradiance larger than 5% of the irradiance at the maximum peak wavelength in the emission spectrum (e.g. the emission spectrum is broad throughout a wide wavelength region). In this way, the irradiance at each wavelength in the wavelength region shorter than 300 nm can be set to not larger than 5%, preferably not larger than 1%, more preferably not larger than 0.1%, even more preferably 0% of the irradiance at the maximum peak wavelength. Here, if there exist multiple peaks in the wavelength region of 300 to 400 nm in the emission spectrum, a peak wavelength exhibiting the largest absorbance thereamong is regarded as the maximum peak wavelength. There are no particular restrictions on the optical filter so long as it is capable of cutting a wavelength(s) shorter than 300 nm; a known optical filter may be used. For example, there may be used a 365 nm bandpass filter or the like. Here, illuminance of ultraviolet and spectrum distribution can be measured by a spectroradiometer such as USR-45D (by Ushio Inc.).

There are no particular restrictions on a light irradiation device; there may be used an irradiation device such as a spot-type irradiation device, a surface-type irradiation device, a line-type irradiation device and a conveyer-type irradiation device.

When curing the photocurable fluoropolyether-based elastomer composition, a light irradiation time, though depending on the illuminance of the light used, is, for example, 1 to 300 sec, preferably 10 to 200 sec, more preferably 30 to 150 sec; after performing light irradiation for 1 to 60 min, particularly 5 to 30 min, the composition will lose fluidity to obtain a rubber elastic body.

Further, an environmental temperature at the time of performing photocuring impacts a curing time. That is, a low temperature requires a longer period of time for curing to be completed, whereas a high temperature requires a shorter period of time for curing to be completed. In terms of taking advantage of the characteristics of photocuring, the environmental temperature at the time of curing is preferably 10 to 120° C. A temperature lower than such temperature is not preferable in terms of workability, because a long period of time will be required for curing; in contrast, a temperature higher than such temperature is also not preferable, because certain base materials may cause heat deterioration (heat deformation and heat discoloration).

In the present invention, the method for applying the photocurable fluoropolyether-based elastomer composition to the surface-modified base material may be such a method where the composition is at first applied to the base material, and light irradiation is then performed by the abovementioned method so as to cure the same; or where the composition that has already and separately been subjected to light irradiation is to be applied to the base material before the composition has cured.

Here, there are no particular restrictions on the method for applying the composition; there may be employed, for example, potting, bar coating, roll coating and spin coating. Further, there are no particular restrictions on an application amount of the composition; it is preferred that the amount be such that a coating thickness will reach 1 m to 10 mm, particularly 10 m to 5 mm.

3. Step of Bonding Fluorine Elastomer

By leaving the fluorine elastomer (cured product) at rest on the base material for a given period of time or longer, the base material and the fluorine elastomer (cured product) can be bonded to each other. Here, if not left at rest for a sufficient amount of time, although there will be obtained a cured product having a rubber elasticity, an adhesiveness to the base material may be insufficient.

At that time, it is required that an environmental temperature under which the cured product is left at rest be 10 to 120° C. A temperature lower than such temperature range requires a longer period of time for adhesiveness to be expressed; in contrast, a temperature higher than such temperature range is also not preferable, because certain base materials may cause heat deterioration (heat deformation and heat discoloration).

Further, there are no particular restrictions on the time period for leaving the cured product at rest, because such time period depends on the environmental temperature and may thus be appropriately selected; it is preferred that this time period be 5 min to 7 days, more preferably 10 min to 48 hours, particularly preferably 6 to 48 hours.

The bonding method of the present invention is useful as a method for bonding a cured product of a photocurable fluoropolyether-based elastomer composition to, for example, automobile-related parts and various electric and electronic parts. For example, in terms of adhesion sealing agents, protective coating agents and potting agents for detectors and sensors such as various pressure sensors used in vehicular control systems, gas concentration detectors and temperature sensors; protective sealing agents for sensors or the like that are exposed to various gases, warm water, chemicals and the like; adhesive agents for use in ink-jet printers; adhesive agents and sealing agents for use in printer heads; coating agents for rollers and belts of laser printers and copying devices; and adhesion sealing agents, coating agents and potting agents for various circuit substrates, the method of the present invention is a useful method for bonding a cured product of a photocurable fluoropolyether-based elastomer composition to these parts.

WORKING EXAMPLES

The present invention is described in detail hereunder with reference to preparation, working and comparative examples; however, the present invention is not limited to the following working examples. Here, in the following examples, parts refer to parts by mass. Me represents a methyl group, and Vi represents a vinyl group. Further, a molecular weight refers to a number average molecular weight in terms of polystyrene in a GPC analysis. A viscosity refers to a value measured at 23° C. (in accordance with JIS K7117-1).

Preparation of Base Compound A

Here, 100 parts of a polymer represented by the following formula (7) (viscosity 11,000 mPa s, number average molecular weight 17,500, vinyl group content 0.012 mol/100 g) were put into a planetary mixer, followed by adding thereto, in divided doses, 10 parts of an aerosol silica (BET specific surface area 110 m²/g) surface-treated with dimethyldichlorosilane, while maintaining an inner temperature at 50 to 100° C. Next, heating was stopped to then perform kneading under a reduced pressure for an hour (gage pressure; −0.093 MPa). The device was again heated while keeping performing kneading; after the inner temperature had reached 130° C., heat treatment was performed under a reduced pressure for an hour (gage pressure; −0.093 MPa) while maintaining the temperature at 130 to 160° C. Next, the content was cooled to a temperature of 40° C. or lower, followed by taking out such content, and then passing the same through a triple roll mill twice to obtain a base compound A (base A).

heat treatment was performed under a reduced pressure for an hour (gage pressure; −0.093 MPa) while maintaining the temperature at 130 to 160° C. Next, the content was cooled to a temperature of 40° C. or lower, followed by taking out such content, and then passing the same through a triple roll mill twice to obtain a base compound C (base C).

Preparation of Base Compound D

Here, 100 parts of a polymer represented by the above formula (7) were put into a planetary mixer, followed by adding thereto, in divided doses, 10 parts of porous silica beads (SB-300 by Miyoshi Kasei, Inc., average primary particle size 5 m), while maintaining an inner temperature at 50 to 100° C. Next, heating was stopped to then perform kneading under a reduced pressure for an hour (gage pressure; −0.093 MPa). The device was again heated while keeping performing kneading; after the inner temperature had reached 130° C., heat treatment was performed under a reduced pressure for an hour (gage pressure; −0.093 MPa) while maintaining the temperature at 130 to 160° C. Next, the content was cooled to a temperature of 40° C. or lower, followed by taking out such content, and then passing the same through a triple roll mill twice to obtain a base compound D (base D).

[Chemical formula 41]

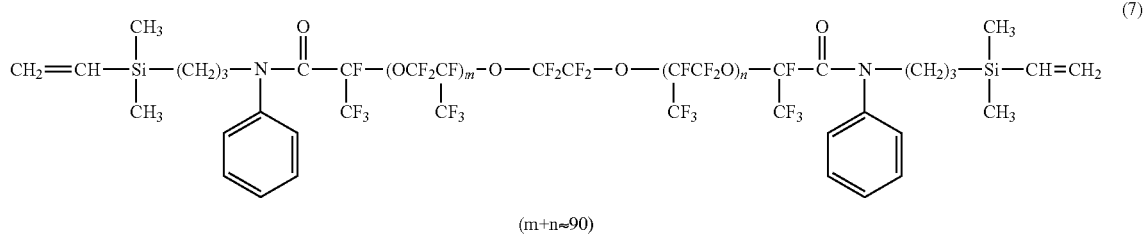

(m+n≈90)

Preparation of Base Compound B

Here, 100 parts of a polymer represented by the above formula (7) were put into a planetary mixer, followed by adding thereto, in divided doses, 10 parts of a zeolite (Zeoal Z4A-005 by Nakamura Choukou Co., Ltd., average primary particle size 50 nm), while maintaining an inner temperature at 50 to 100° C. Next, heating was stopped to then perform kneading under a reduced pressure for an hour (gage pressure; −0.093 MPa). The device was again heated while keeping performing kneading; after the inner temperature had reached 130° C., heat treatment was performed under a reduced pressure for an hour (gage pressure; −0.093 MPa) while maintaining the temperature at 130 to 160° C. Next, the content was cooled to a temperature of 40° C. or lower, followed by taking out such content, and then passing the same through a triple roll mill twice to obtain a base compound B (base B).

Preparation of Base Compound C

Here, 100 parts of a polymer represented by the above formula (7) were put into a planetary mixer, followed by adding thereto, in divided doses, 10 parts of a molecular sieve powder 3A (by UNION SHOWA K.K., porous zeolite powder with average primary particle size of 1,800 nm), while maintaining an inner temperature at 50 to 100° C. Next, heating was stopped to then perform kneading under a reduced pressure for an hour (gage pressure; −0.093 MPa). The device was again heated while keeping performing kneading; after the inner temperature had reached 130° C., Preparation of Photocurable Fluoropolyether-Based Elastomer Composition Preparation Example 1

Here, 55 parts of the base compound A and 55 parts of the base compound B were put into a planetary mixer and mixed together until uniformity had been achieved. Further, 0.055 parts of a 1,3-bis(trifluoromethyl)benzene solution of (methylcyclopentadienyl)trimethyl platinum (IV) (platinum concentration 3.0% by mass) and 0.064 parts of a toluene solution of 1-ethynyl-1-hydroxycyclohexane (5.0% by mass) were added thereto and mixed therewith until uniformity had been achieved. Next, 0.25 parts of a fluorine-containing organohydrogen polysiloxane represented by the following formula (9) (Si—H group content 0.0050 mol/g), 1.96 parts of a fluorine-containing organohydrogen polysiloxane represented by the following formula (10) (Si—H group content 0.0072 mol/g), 2.2 parts of an adhesiveness imparting agent represented by the following formula (12) and 0.1 parts of an epoxy group-containing silane compound represented by the following formula (13) were sequentially added thereto and mixed therewith until uniformity had been achieved. Later, a composition A was produced by carrying out a defoaming operation using a centrifugal separator.

[Chemical formula 42]

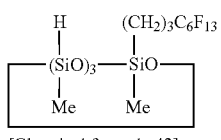
(9)

[Chemical formula 43]

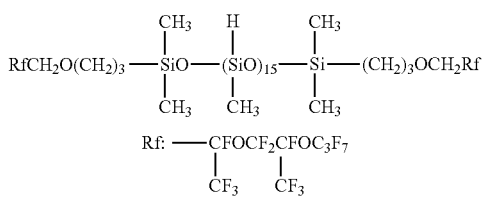
(10)

[Chemical formula 44]

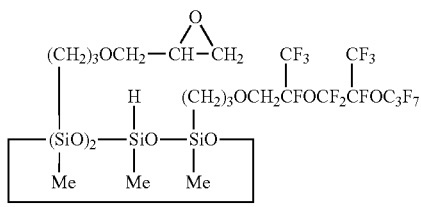
(12)

[Chemical formula 45]

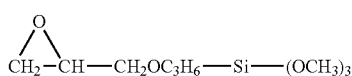
(13)

Preparation Example 2

Here, 55 parts of the base compound A, 33 parts of the base compound B and 20 parts of the polymer represented by the above formula (7) were put into a planetary mixer and mixed together until uniformity had been achieved. Further, 0.054 parts of a 1,3-bis(trifluoromethyl)benzene solution of (methylcyclopentadienyl)trimethyl platinum (IV) (platinum concentration 3.0% by mass) and 0.063 parts of a toluene solution of 1-ethynyl-1-hydroxycyclohexane (5.0% by mass) were added thereto and mixed therewith until uniformity had been achieved. Next, 1.23 parts of a fluorine-containing organohydrogen polysiloxane represented by the above formula (9) (Si—H group content 0.0050 mol/g), 1.20 parts of a fluorine-containing organohydrogen polysiloxane represented by the above formula (10) (Si—H group content 0.0072 mol/g), 2.2 parts of an adhesiveness imparting agent represented by the above formula (12) and 0.1 parts of an epoxy group-containing silane compound represented by the above formula (13) were sequentially added thereto and mixed therewith until uniformity had been achieved. Later, a composition B was produced by carrying out a defoaming operation using a centrifugal separator.

Preparation Example 3

Here, 55 parts of the base compound A, 11 parts of the base compound B and 40 parts of the polymer represented by the above formula (7) were put into a planetary mixer and mixed together until uniformity had been achieved. The rest of the components were added thereto and mixed therewith in a similar manner as the preparation example 1 to produce a composition C.

Preparation Example 4

Here, 55 parts of the base compound B and 50 parts of the polymer represented by the above formula (7) were put into a planetary mixer and mixed together until uniformity had been achieved. The rest of the components were added thereto and mixed therewith in a similar manner as the preparation example 1 to produce a composition D.

Preparation Example 5

Here, 55 parts of the base compound A and 55 parts of the base compound C were put into a planetary mixer and mixed together until uniformity had been achieved. The rest of the components were added thereto and mixed therewith in a similar manner as the preparation example 1 to produce a composition E.

Preparation Example 6

Here, 55 parts of the base compound A and 50 parts of the polymer represented by the above formula (7) were put into a planetary mixer and mixed together until uniformity had been achieved. The rest of the components were added thereto and mixed therewith in a similar manner as the preparation example 1 to produce a composition F.

Preparation Example 7

Here, 88 parts of the base compound A and 20 parts of the polymer represented by the above formula (7) were put into a planetary mixer and mixed together until uniformity had been achieved. The rest of the components were added thereto and mixed therewith in a similar manner as the preparation example 1 to produce a composition G.

Preparation Example 8

Here, 55 parts of the base compound A and 55 parts of the base compound D were put into a planetary mixer and mixed together until uniformity had been achieved. The rest of the components were added thereto and mixed therewith in a similar manner as the preparation example 1 to produce a composition H.

Working Examples 1 to 5; and Comparative Examples 1 to 3

Viscosity of Each Composition

Measurement was performed on each of the compositions produced in working examples 1 to 5 and comparative examples 1 to 3 (the compositions A to H) at 23° C. in accordance with JIS K7117-1. The results thereof are shown in Tables 1 and 2.

Curability Test of Photo-Curable Material

After loading a cartridge container with the composition obtained, the composition was then pushed out onto a tetrafluoroethylene-made flat plate (50 mm×50 mm×2 mm), followed by using a bar coater to spread the composition thereon such that the thickness of the composition would become 1 mm. An UV-LED irradiation device (by CCS Inc., 365 nm type) was then used to perform light irradiation on the tetrafluoroethylene-made flat plate to which the composition had been applied. At that time, irradiation was performed at a wavelength of 365 nm, an UV illuminance of 100 mW/cm² and a temperature of 23° C. for 90 sec. After being left at rest at 23° C. for 24 hours, a surface condition was observed, where ○ was given to examples in which the composition had cured without exhibiting tackiness, and x was given to examples in which the composition had not cured while exhibiting tackiness. The results thereof are shown in Tables 1 and 2.

Adhesion Test of Photo-Curable Material

Next, as for each type of test panel (50 mm×25 mm) described in Tables 1 and 2 that serves as an adherend and is used as a pair, the test panel was degreased with ethanol, followed by performing a plasma treatment thereon using a low-pressure plasma irradiation device (plasma dry cleaner by Yamato Scientific co., ltd., $O_2/Ar=80$ cc/20 cc, RF output; 250 W, irradiation time; 30 sec). After the plasma treatment was over, 2 g of each composition was applied to one adherend, followed by performing light irradiation thereon in a similar manner as described above. Later, the one adherend was laminated onto the other adherend so that the end portions of the adherends would overlap by 10 mm each, with a composition layer of a thickness of 80 m being sandwiched therebetween. They were then left at rest at 23° C. for 24 hours to obtain an adhesion test piece. Next, a tensile shearing adhesion strength test (tension rate 50 mm/min) was carried out in accordance with JIS K6850 so as to evaluate a tensile shearing adhesion strength (MPa) and a cohesion failure rate (% by area). The results thereof are shown in Tables 1 and 2.

Foaming Test of Photo-Curable Material

After degreasing the surface of a glass plate (50 mm×50 mm×1 mm) with ethanol, 1 g of each composition was applied to the center of the glass plate, followed by performing light irradiation thereon in a similar manner as described above. Next, a metal plate of a thickness of 1 mm was placed in a 10 mm region at both sides of the glass plate, followed by laying another glass plate thereon from above to sandwich each composition layer therebetween. They were then left at rest at 23° C. for two hours under such condition, where ○ was given to examples in which foaming was not observed in the resin layer, and x was given to examples in which foaming was observed even in one sample. The results thereof are shown in Tables 1 and 2.

TABLE 1

| Fluoropolyether-based elastomer composition | | Working example 1 (Composition A) | Working example 2 (Composition B) | Working example 3 (Composition C) | Working example 4 (Composition D) |
|---|---|---|---|---|---|
| Base A | | 55 | 55 | 55 | 0 |
| Base B | | 55 | 33 | 11 | 55 |
| Base C | | 0 | 0 | 0 | 0 |
| Base D | | 0 | 0 | 0 | 0 |
| Polymer (7) | | 0 | 20 | 40 | 50 |
| Polymer (7)/Aerosol silica/Zeolite (Weight ratio) | | 100/5/5 | 100/5/3 | 100/5/1 | 100/0/5 |
| Fluorine-containing organohydrogenpolysiloxane (9) | | 0.25 | 1.23 | 0.25 | 0.25 |
| Si-H group/Vi group (Molar ratio) | | 0.10 | 0.50 | 0.10 | 0.10 |
| Fluorine-containing organohydrogenpolysiloxane (10) | | 1.96 | 1.20 | 1.96 | 1.95 |
| Si-H group/Vi group (Molar ratio) | | 1.15 | 0.70 | 1.15 | 1.15 |
| Photoactive hydrosilylation reaction catalyst (Methylcyclopentadienyl)trimethyl platinum (IV) solution | | 0.055 | 0.054 | 0.055 | 0.053 |
| Reaction control agent 1-ethynyl-1-hydroxycyclohexane solution | | 0.064 | 0.063 | 0.064 | 0.062 |
| Adhesiveness imparting agent Fluorine and epoxy group-containing organohydrogensiloxane (12) | | 2.2 | 2.2 | 2.2 | 2.2 |
| Epoxy group-containing silane compound (13) | | 0.1 | 0.1 | 0.1 | 0.1 |
| Evaluation results | | | | | |
| Viscosity of composition (Pa · s) | | 44.9 | 29.5 | 20.5 | 12.5 |
| Curability test | | ○ | ○ | ○ | ○ |
| Adhesion test | Aluminum | 3.7(100) | 3.9(100) | 3.6(100) | 1.2(100) |
| Tensile shearing adhesion strength | PPS | 3.4(100) | 2.9(100) | 3.4(100) | 1.5(100) |
| (MPa) | PBT | 3.5(100) | 3.6(100) | 3.2(100) | 1.3(100) |
| (Cohesion failure rate (% by area)) | PET | 2.4(100) | 2.3(100) | 2.5(100) | 0.9(100) |
| Foaming test | | ○ | ○ | ○ | ○ |

TABLE 2

| Fluoropolyether-based elastomer composition | Working example 5 (Composition E) | Comparative example 1 (Composition F) | Comparative example 2 (Composition G) | Comparative example 3 (Composition H) |
|---|---|---|---|---|
| Base A | 55 | 55 | 88 | 55 |
| Base B | 0 | 0 | 0 | 0 |
| Base C | 55 | 0 | 0 | 0 |
| Base D | 0 | 0 | 0 | 55 |
| Polymer (7) | 0 | 50 | 20 | 0 |
| Polymer (7)/Aerosol silica/Zeolite (Weight ratio) | 100/5/5 | 100/5/0 | 100/8/0 | 100/5/5 (Porous silica) |
| Fluorine-containing organohydrogenpolysiloxane (9) | 0.25 | 0.25 | 0.25 | 0.25 |
| Si-H group/Vi group (Molar ratio) | 0.10 | 0.10 | 0.10 | 0.10 |

TABLE 2-continued

| Fluoropolyether-based elastomer composition | | Working example 5 (Composition E) | Comparative example 1 (Composition F) | Comparative example 2 (Composition G) | Comparative example 3 (Composition H) |
|---|---|---|---|---|---|
| Fluorine-containing organohydrogenpolysiloxane (10) | | 1.95 | 1.96 | 1.98 | 1.96 |
| Si-H group/Vi group (Molar ratio) | | 1.15 | 1.15 | 1.15 | 1.15 |
| Photoactive hydrosilylation reaction catalyst (Methylcyclopentadienyl)trimethyl platinum (IV) solution | | 0.053 | 0.055 | 0.054 | 0.055 |
| Reaction control agent 1-ethynyl-1-hydroxycyclohexane solution | | 0.062 | 0.064 | 0.063 | 0.064 |
| Adhesiveness imparting agent Fluorine and epoxy group-containing organohydrogensiloxane (12) | | 2.2 | 2.2 | 2.2 | 2.2 |
| Epoxy group-containing silane compound (13) | | 0.1 | 1.0 | 0.1 | 0.1 |
| Evaluation results | | | | | |
| Viscosity of composition (Pa-s) | | 50.7 | 17.7 | 25.8 | 14.3 |
| Curability test | | ○ | ○ | ○ | ○ |
| Adhesion test | Aluminum | 2.8(100) | 2.3(95) | 3.7(100) | 1.7(70) |
| Tensile shearing adhesion strength | PPS | 2.5(100) | 1.8(90) | 3.4(90) | 1.8(60) |
| (MPa) | PBT | 2.3(100) | 2.1(95) | 3.1(95) | 1.5(65) |
| (Cohesion failure rate (% by area)) | PET | 1.9(100) | 2.0(90) | 2.5(95) | 1.2(60) |
| Foaming test | | ○ | x | x | x |

As shown by the results in Tables 1 and 2, it was confirmed that in the cases of the working examples of the present invention, if the composition is a zeolite-containing photocurable fluoropolyether-based elastomer composition, when photocured, the composition can be favorably bonded to various types of base materials at a low temperature and in a short period of time without generating air bubbles in the fluorine elastomer resin.

The invention claimed is:

1. A photocurable fluoropolyether-based elastomer composition comprising:
   (A) 100 parts by mass of a linear polyfluoro compound having at least two alkenyl groups per each molecule and a perfluoropolyether structure in a main chain;
   (B) a fluorine-containing organohydrogenpolysiloxane having at least two silicon atom-bonded hydrogen atoms per each molecule, the component (B) being in an amount at which the silicon atom-bonded hydrogen atoms in the component (B) are in an amount of 0.8 to 2.0 mol per 1 mol of the alkenyl groups in the component (A);
   (C) a photoactive hydrosilylation reaction catalyst in an amount of 0.1 to 500 ppm with respect to a mass of the component (A); and
   (D) 1 to 5 parts by mass of a zeolite having an average primary particle size 0.05 μm to 1.8 μm.

2. The photocurable fluoropolyether-based elastomer composition according to claim 1, wherein the component (A) is a linear fluoropolyether compound represented by the following formula (1):

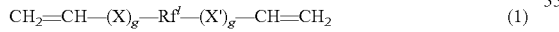
$$CH_2=CH-(X)_g-Rf'-(X')_g-CH=CH_2 \quad (1)$$

wherein X represents —CH$_2$—, —CH$_2$O—, —CH$_2$OCH$_2$— or —Y—NR$^1$—CO—; X' represents —CH$_2$—, —OCH$_2$—, —CH$_2$OCH$_2$— or —CO—NR$^2$—Y'—; g independently represents 0 or 1; Rf' represents a divalent perfluoropolyether group expressed by a formula (i) or (ii), wherein Y represents —CH$_2$—, —Si(CH$_3$)$_2$CH$_2$CH$_2$CH$_2$—, —Si(CH$_3$)(CH=CH$_2$)CH$_2$CH$_2$CH$_2$—, —Si(CH=CH$_2$)$_2$CH$_2$CH$_2$CH$_2$—, or a o-, m- or p-silylphenylene group represented by a structural formula (Z); R$^1$ represents a hydrogen atom or a substituted or unsubstituted monovalent hydrocarbon group; Y' represents —CH$_2$—, —CH$_2$CH$_2$CH$_2$Si(CH$_3$)$_2$—, —CH$_2$CH$_2$CH$_2$Si(CH$_3$)(CH=CH$_2$)—, —CH$_2$CH$_2$CH$_2$Si(CH=CH$_2$)$_2$—, or a o-, m- or p-silylphenylene group represented by a structural formula (Z'); R$^2$ represents a hydrogen atom or a substituted or unsubstituted monovalent hydrocarbon group, wherein the structural formulae (Z) and (Z') are:

(Z)

wherein each of R$^3$ and R$^4$ independently represents —CH$_3$ or —CH=CH$_2$; and

(Z')

wherein each of R$^{3'}$ and R$^{4'}$ independently represents —CH$_3$ or —CH=CH$_2$, and the formulae (i) and (ii) are:

(i)

wherein each of p and q is 0 or an integer of 1 to 150, an average of a sum of p and q is 2 to 200, r is an integer of 0 to 6, t is 2 or 3; and

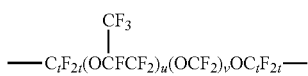

(ii)

wherein u is an integer of 1 to 200, v is an integer of 1 to 50, t is 2 or 3.

3. The photocurable fluoropolyether-based elastomer composition according to claim 1, further comprising:
(E) a hydrophobic silica powder in an amount of 0.5 to 30 parts by mass per 100 parts by mass of the component (A).

4. The photocurable fluoropolyether-based elastomer composition according to claim 1, further comprising:
(F) an organohydrogen siloxane compound having, per each molecule, at least one silicon atom-bonded hydrogen atom and at least one epoxy and/or trialkoxysilyl group bonded to the silicon atom via a carbon atom or carbon and oxygen atoms, the component (F) differing from the component (B) and being in an amount of 0.05 to 5.0 parts by mass per 100 parts by mass of the component (A).

5. The photocurable fluoropolyether-based elastomer composition according to claim 1, further comprising:
(G) a reaction control agent for hydrosilylation reaction.

6. A bonding method for bonding a cured product of an elastomer composition to a base material, comprising:
a step of modifying a surface of a base material by plasma irradiation in advance;
a step of applying the photocurable fluoropolyether-based elastomer composition according to claim 1 to an outer surface of the base material, and then curing the elastomer composition by performing light irradiation on a surface of the elastomer composition; and
a step of leaving the cured composition at rest at 10 to 120° C.

7. The bonding method according to claim 6, wherein the base material is made of a metal, glass, ceramics or a synthetic resin.

8. The photocurable fluoropolyether-based elastomer composition according to claim 1, wherein the component (B) is added in an amount at which the silicon atom-bonded hydrogen atoms in the component (B) are in an amount of more than 1.20 and 3.0 mol or less per 1 mol of the alkenyl groups in the component (A).

9. A cured product of the photocurable fluoropolyether-based elastomer composition according to claim 1.

10. The photocurable fluoropolyether-based elastomer composition according to claim 1, wherein the photocurable fluoropolyether-based elastomer composition essentially consists of:
the components (A) to (D);
(F) an organohydrogen siloxane compound having, per each molecule, at least one silicon atom-bonded hydrogen atom and at least one epoxy and/or trialkoxysilyl group bonded to the silicon atom via a carbon atom or carbon and oxygen atoms, the component (F) differing from the component (B) and being in an amount of 0.05 to 5.0 parts by mass per 100 parts by mass of the component (A); and
(G) a reaction control agent for hydrosilylation reaction.

* * * * *